(12) United States Patent
Parrish et al.

(10) Patent No.: US 11,353,365 B2
(45) Date of Patent: Jun. 7, 2022

(54) DESIGN, TEST, AND OPERATION OF A SMALL THERMAL IMAGING CORE

(71) Applicant: Seek Thermal, Inc., Goleta, CA (US)

(72) Inventors: William J. Parrish, Santa Barbara, CA (US); Andreas Engberg, Santa Barbara, CA (US); Jason Wolfe, Santa Barbara, CA (US); Derek Moran, Santa Barbara, CA (US); Blake Henry, Santa Barbara, CA (US); Ross Williams, Santa Barbara, CA (US); Russ Mead, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 8 days.

(21) Appl. No.: 16/623,751

(22) PCT Filed: Jun. 20, 2018

(86) PCT No.: PCT/US2018/038606
§ 371 (c)(1),
(2) Date: Dec. 17, 2019

(87) PCT Pub. No.: WO2018/237079
PCT Pub. Date: Dec. 27, 2018

(65) Prior Publication Data
US 2020/0217719 A1   Jul. 9, 2020

Related U.S. Application Data

(60) Provisional application No. 62/545,922, filed on Aug. 15, 2017, provisional application No. 62/523,113, filed on Jun. 21, 2017.

(51) Int. Cl.
*G01J 5/02*   (2022.01)
*G01J 5/0806*   (2022.01)
(Continued)

(52) U.S. Cl.
CPC ............ *G01J 5/0205* (2013.01); *G01J 5/0215* (2013.01); *G01J 5/0806* (2013.01); *G01J 5/20* (2013.01);
(Continued)

(58) Field of Classification Search
CPC .. H04N 5/2257; H04N 5/2253; H04N 5/2252; G01J 5/02; G01J 5/20; G01J 3/0256
See application file for complete search history.

(56) References Cited

U.S. PATENT DOCUMENTS 4,967,082 A   10/1990   Cooke et al.
5,471,055 A   11/1995   Costanzo et al.
(Continued)

FOREIGN PATENT DOCUMENTS

KR   101 251 649   4/2013
WO   WO 2014/106276   7/2014
(Continued)

OTHER PUBLICATIONS

Goushcha, et al., "Automatic Test System for Wafer Level Probing Photodiode of Optical and Electrical Parameters of Array Dies," 2006 IEEE Nuclear Science Symposium Conference Record, vol. 2. Oct. 29, 2006.
(Continued)

*Primary Examiner* — David P Porta
*Assistant Examiner* — Fani Boosalis
(74) *Attorney, Agent, or Firm* — Knobbe Martens Olson & Bear, LLP

(57) ABSTRACT

An ultra-small thermal imaging core, or micro-core. The design of the micro-core may include substrates for mounting optics and electronic connectors that are thermally matched to the imaging Focal Plane Array (FPA). Test fixtures for test and adjustment that allow for operation and image acquisition of multiple cores may also be provided.
(Continued)

Tooling may be included to position the optics to set the core focus, either by moving the lens and lens holder as one or by pushing and/or pulling the lens against a lens positioning element within the lens holder, while observing a scene. Test procedures and fixtures that allow for full temperature calibration of each individual core, as well as providing data useful for uniformity correction during operation may also be included as part of the test and manufacture of the core.

9 Claims, 17 Drawing Sheets

(51) Int. Cl.
    *G01J 5/20*     (2006.01)
    *H04N 5/225*     (2006.01)
    *G01J 5/00*     (2022.01)

(52) U.S. Cl.
    CPC ......... *H04N 5/2252* (2013.01); *H04N 5/2254* (2013.01); *G01J 2005/0077* (2013.01)

(56) References Cited

U.S. PATENT DOCUMENTS

| | | | |
|---|---|---|---|
| 5,811,808 | A | 11/1998 | Cannata et al. |
| 7,683,321 | B1 | 3/2010 | King et al. |
| 8,378,290 | B1 | 2/2013 | Speake et al. |
| 2002/0074499 | A1 | 6/2002 | Butler |
| 2002/0177330 | A1 | 11/2002 | Haffenden |
| 2004/0041911 | A1 | 3/2004 | Odagiri |
| 2008/0170228 | A1 | 7/2008 | Jiang |
| 2008/0210872 | A1 | 9/2008 | Grimberg |
| 2010/0220193 | A1* | 9/2010 | Hogasten ............. H04N 5/3658 348/164 |
| 2011/0299846 | A1 | 12/2011 | Weisbach |
| 2012/0312976 | A1* | 12/2012 | Boulanger ........... H04N 17/002 250/252.1 |
| 2013/0178245 | A1 | 7/2013 | Kulas |
| 2014/0240689 | A1 | 8/2014 | Arbouzov |
| 2014/0300809 | A1 | 10/2014 | Oliveira |
| 2015/0177313 | A1 | 6/2015 | Hoelter et al. |
| 2015/0281601 | A1* | 10/2015 | Ganapathi ......... H01L 27/14643 348/164 |
| 2015/0312488 | A1 | 10/2015 | Kostrzewa et al. |
| 2016/0061883 | A1 | 3/2016 | Engberg et al. |

FOREIGN PATENT DOCUMENTS

| | | |
|---|---|---|
| WO | WO 2014/173464 | 10/2014 |
| WO | WO 2015/070105 | 5/2015 |

OTHER PUBLICATIONS

"Customized Wafer Probing Solutions," MicroXact, Inc., 2012, accessed Jun. 27, 2016.

Duykers, "Test Results of a 'Factory' Calibration Technique for Non-Uniformity Correction of an InSb Infrared System," Proc. SPIE 3063, Infrared Imaging Systems: Design, Analysis, Modeling, and Testing VIII. Jun. 16, 1997.

Whicker, "Automated Radiometric Cryoprobe of IRFPA Wafers," Proc. SPIE 2228, Producibility of II-VI Materials and Devices. Jul. 13, 1994.

SUSS Report, Feb. 2009 issue, SUSS MicroTec AG. Jan. 2009.

* cited by examiner

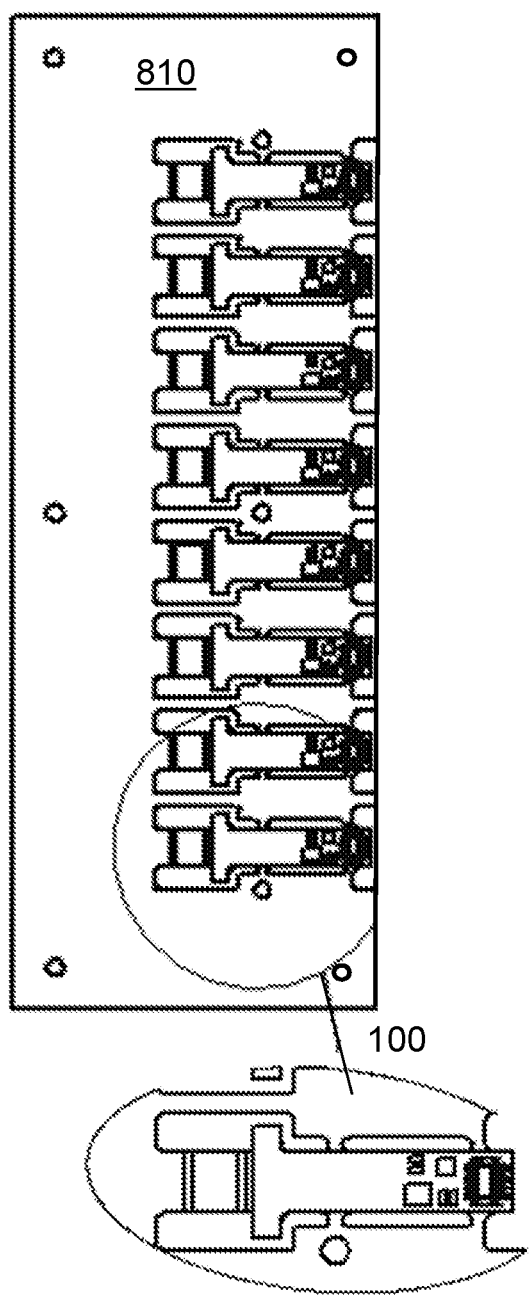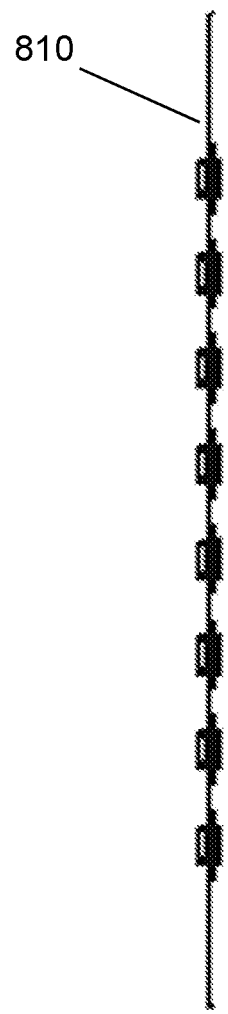
FIG. 8A
FIG. 8B $F(S)_{BBn}, T_{scenek}$

8 BB scene temperatures by 15 ambient temperatures = 120 data set values per pixel, interpolate by 4, = X 4 points in data set or 480 data set points per pixel

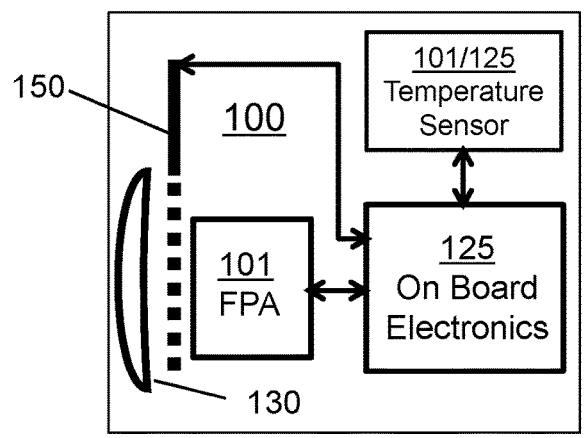
FIG. 15A
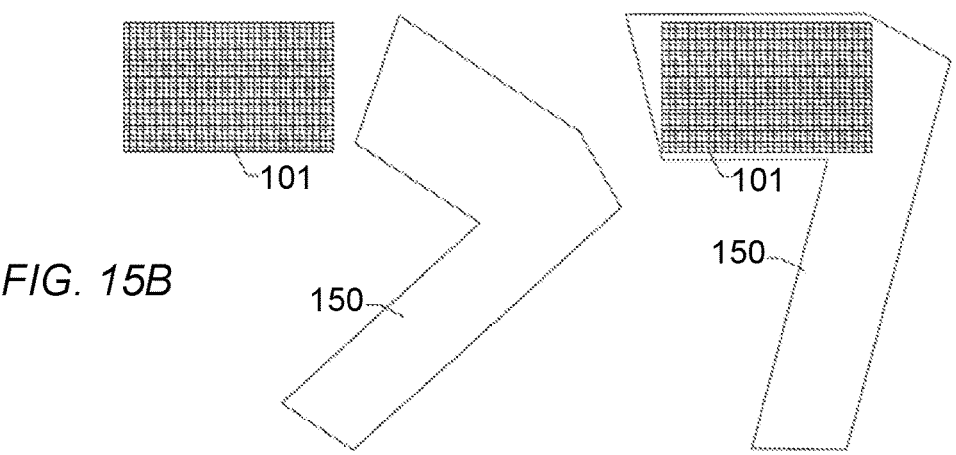
FIG. 15B
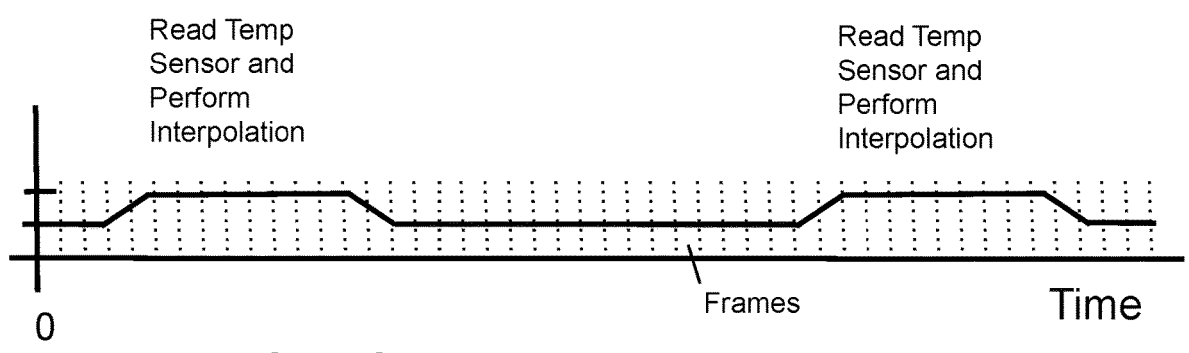
FIG. 15C   Shutter Closed/Open

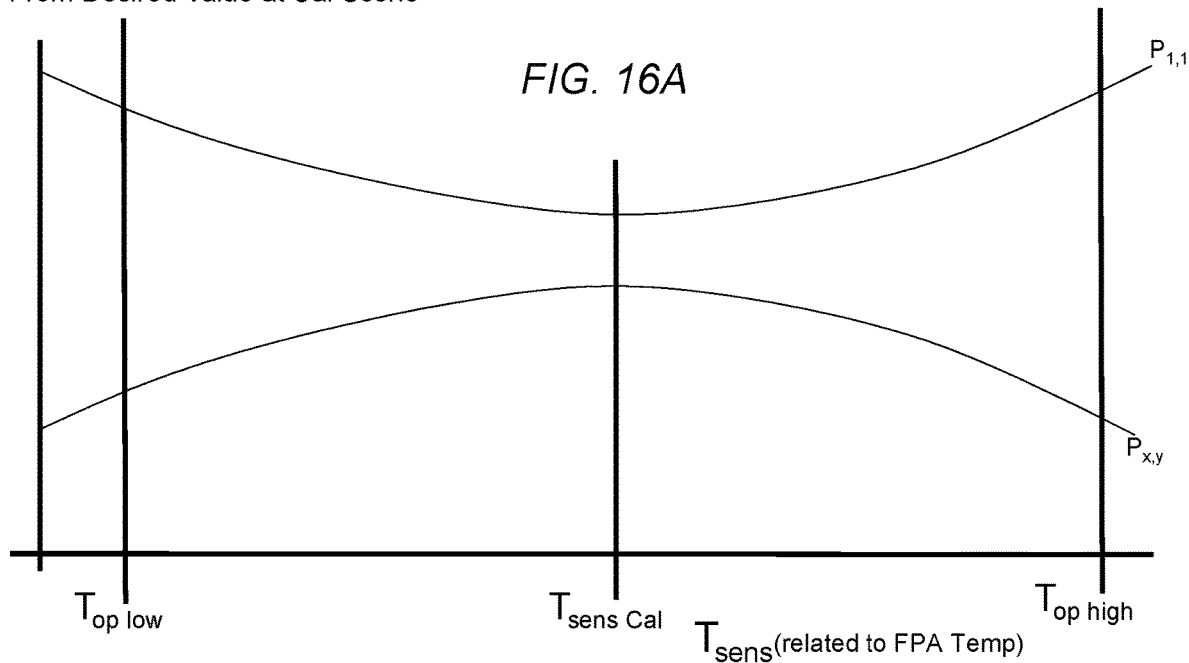
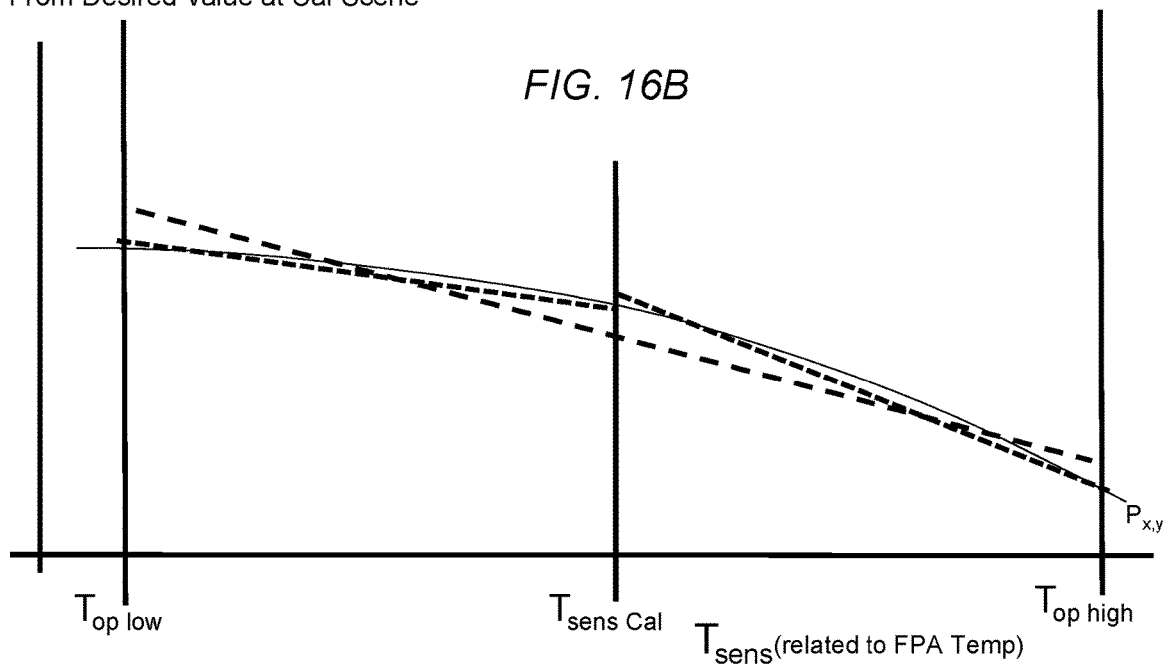

DESIGN, TEST, AND OPERATION OF A SMALL THERMAL IMAGING CORE

INCORPORATION BY REFERENCE TO ANY PRIORITY APPLICATIONS

This application claims the benefit of priority under 35 U.S.C. § 119(e) of U.S. Provisional Application No. 62/523,113, filed Jun. 21, 2017, entitled "DESIGN, TEST, AND OPERATION OF A SMALL THERMAL IMAGING CORE," and U.S. Provisional Application No. 62/545,922, filed Aug. 15, 2017, entitled "DESIGN, TEST, AND OPERATION OF A SMALL THERMAL IMAGING CORE." The entire disclosure of each of these priority documents is hereby incorporated by reference.

FIELD

The specification relates to a very small thermal imaging core and, in particular, to the design, test, and operational elements that enable the inclusion of thermal imaging into small devices such as smartphones, miniature drones, very small monitoring/security systems, and the like.

BACKGROUND

The increasing availability of high-performance, low-cost uncooled thermal imaging devices, such as those based on bolometer focal plane arrays (FPAs), is enabling the design and production of consumer-oriented thermal imaging cameras and sensors capable of quality thermal imaging. Such thermal imaging systems have long been expensive and difficult to produce, thus limiting the employment of high-performance, long-wave imaging to high-value instruments only available for aerospace, military, or large-scale commercial applications. Thermal imaging systems of a given design (produced in quantity) may have different design requirements than complex military or industrial systems. Providing thermal imagers for consumer applications with challenging cost and space requirements, such as thermal imagers for smartphones and other personal electronic devices (PED's), may benefit from new techniques spanning the design, manufacture, test, and operation of very small thermal imaging cores.

SUMMARY

Example embodiments described herein have innovative features, no single one of which is indispensable or solely responsible for their desirable attributes. Without limiting the scope of the claims, some of the advantageous features will now be summarized.

In some embodiments an ultra-small thermal imaging core, or micro-core, may be provided. The design of the micro-core may include substrates, for mounting optics and electronic connectors, that are thermally matched to the imaging Focal Plane Array (FPA). Tooling may be provided to position the optics to set the core focus, either by moving the lens and lens holder as one or by pushing and/or pulling the lens against a lens positioning element within the lens holder, while observing a scene. Test procedures that allow for full temperature calibration of each individual core, as well as providing data useful for uniformity correction during operation, may also be provided as part of the test and manufacture of the core.

In some embodiments, a thermal imaging micro-core comprises a thermal imaging Focal Plane Array, micro-fabricated at least in part of a first material; a substrate of a second material that has substantially the same thermal properties as the first material; at least one optical element; an optical housing; and a circuit element, wherein the FPA is bonded to the substrate, the optical element is attached to the housing, the housing is bonded to the substrate with the optical element disposed to expose the FPA to external scenes, and the circuit element is configured to provide connections between the FPA and a host system, and wherein the housing, substrate and FPA assembled together are less than 0.5" in the longest dimension, and the micro-core with the circuit element assembled together are less than 1.5" long and 0.5" in all other dimensions.

In some embodiments, the first and second material are both silicon. In some embodiments, the substrate is a section diced from a silicon wafer of substantially the same thickness as a wafer the FPA is micro-fabricated from. In some embodiments, the circuit element comprises a flex circuit. In some embodiments, the flex circuit is bonded to the substrate. In some embodiments, flex circuit connections to the FPA are made by wire-bonding between contact pads on the flex circuit and contact pads on the FPA. In some embodiments, flex circuit connections to the FPA are made by connections fabricated into the substrate. In some embodiments, the flex circuit connections to the substrate are made by at least one of solder connections between contact pads on the flex circuit and contact pads on the substrate, or bump connections between contact pads on the flex circuit and contact pads on the substrate. In some embodiments, FPA connections to the substrate are made by at least one of solder connections between contact pads on the FPA and contact pads on the substrate, or bump connections between contact pads on the FPA and contact pads on the substrate. In some embodiments, the circuit element includes a connector configured to be compatible with internal host system connectors.

In another embodiment, a process for adjusting the focal distance of a lens for a thermal imager as recited in claim 1 comprises bonding the lens in the housing; placing the housing onto the substrate with the lens suitably positioned relative to the FPA; interfacing to the FPA all inputs and outputs required for operating and acquiring image data from the FPA; observing an imaged scene through the lens with the FPA to determine degree of focus; optimizing the observed image focus by changing the position of the housing relative to the substrate; and fixing the housing position relative to the substrate at the point of optimized focus.

In some embodiments, the fixing the housing position is done with a bonding element, the bonding element including at least one of glue, epoxy, solder, or fasteners. In some embodiments, the method further comprises applying the bonding element to the substrate and housing in an elastic state, finding the focus distance, and rendering the bonding element inelastic with the housing at the desired position. In some embodiments, the bonding agent is curable and the housing position is changed with the element in an uncured state and the element is cured in place at the desired position of the housing. In some embodiments, a change in position due to curing is factored into the positioning of the housing.

In another embodiment, a process for adjusting the focus of a lens for a thermal imager, wherein the thermal imager comprises a Focal Plane Array (FPA), a lens, and a lens housing which holds the lens in relation to the FPA, comprises placing the lens in the housing, wherein the housing is configured to allow positioning adjustment within the housing, and lens tooling is configured to pull and/or push the lens within the housing; inserting a position adjustment element in the housing between the lens and the FPA, wherein the position adjusting element is configured to allow at least a partial unobstructed view of the FPA through the lens; bringing the lens in contact with the positioning adjustment element using the lens tooling wherein the tooling push/pull pressure applied to the lens against the position element allows for temporarily stable positioning of the lens within the housing; observing an image scene through the lens with the FPA to determine degree of focus; optimizing the observed image focus by changing the position of the lens in the housing; fixing the lens position at the point of optimized focus; and removing the positioning element from the housing.

In some embodiments, the positioning element is a tapered shaft oriented substantially perpendicular to the lens focus axis and the lens tooling pushes the lens against the tapered shaft and the temporarily stable position is changed by the tapered shaft being drawn in and out of the housing. In some embodiments, the tapered shaft is at least one of a round tapered shaft or a wedge shaped tapered shaft. In some embodiments, the positioning element is a spring oriented substantially perpendicular to the lens focus axis and the lens tooling pushes the lens against the spring and the temporarily stable position is changed by the balancing of the lens tooling pushing action against the spring's reverse pressure. In some embodiments, the spring is a leaf spring. In some embodiments, the fixing the lens position comprises applying a bonding agent to at least one of the lens and a lens holder, thereby fixing the lens in place. In some embodiments, the housing and the lens are configured with a channel for the bonding agent to be applied that ensures mutual contact of the bonding agent with both lens and housing. In some embodiments, the bonding agent is at least one of glue, epoxy, a rubber sealant, or a spot weld. In some embodiments, the lens holder is at least one of fixed relative to the housing or attached to a fine focus element. In some embodiments, the lens positioning range achievable by the positioning element is greater than 10 microns and the positioning resolution is less than 1 micron. In some embodiments, the lens positioning range achievable by the positioning element is greater than 50 microns. In some embodiments, the micro-core is manufactured on a panel holding a plurality of micro-cores configured for assembly operations on multiple micro-cores. In some embodiments, the micro-core is tested on a panel holding a plurality of micro-cores configured for test operations on multiple micro-cores. In some embodiments, the micro-core's focus is set on a panel holding a plurality of micro-cores configured for focus operations on multiple micro-cores.

In another embodiment, a process for testing a thermal imaging micro-core as recited in claim 1 comprises: placing at least one micro-core in a test fixture; interfacing the micro-core to test electronics configured to operate and acquire image data from the micro-core; exposing the micro-core to a plurality of controlled ambient temperatures; recording the temperature sensor reading representative of each controlled ambient temperature; exposing the micro-core to a plurality of controlled temperature scenes at each controlled ambient temperature and recording the signal level for at least a portion of the pixels for the micro-core acquired image of the scenes; and creating at least one data set for each micro-core comprising of at least one of the signal representative of scene temperature vs. ambient temperature, or pixel-to-pixel variation vs. scene temperature vs. ambient temperature and wherein the tables are at least one of stored for use in each micro-core, or provided with the each micro-core for storage in a processor interfaced to the micro-core when the micro-core is in operation.

In some embodiments, the ambient temperature is controlled by mounting the micro-core to a heat sink whose temperature is controlled. In some embodiments, the heat sink temperature is controlled by at least one of a thermoelectric device or temperature controlled fluid flowed through channels in the heat sink. In some embodiments, the controlled temperature scenes are a plurality of individually temperature controlled black-bodies sequentially presented for viewing by the micro-core. In some embodiments, the black-body temperatures are measured by a pyrometer, and the pyrometer measured temperature is stored in the data set. In some embodiments, the controlled ambient FPA temperatures are varied at least one of continuously or semi-continuously and FPA temperature sensor readings taken during image acquisition are stored in the data set as the ambient temperature data.

In another embodiment, a process for operating a thermal imaging system containing a micro-core tested according to the present technology comprises: applying a Scene-Based Non-Uniformity Correction (SBNUC) comprising of generating a continuously updated Fixed-Pattern Noise (FPN) correction of pixel-by-pixel FPN correction terms, the process comprising reading the temperature sensor; interpolating data from a data set of pixel-to-pixel variations, the closest value to the data set corresponding to both the ambient and black-body temperature corresponding to the actual temperature sensor reading; and using the derived data set as at least one of the gain and offset correction of the image frame or the initial FPN correction term. In some embodiments, the process further comprises scaling and normalizing the data set.

In another embodiment, a thermal imaging system containing a micro-core tested according to the present technology is configured to: apply a Scene-Based Non-Uniformity Correction (SBNUC) comprised of generating a continuously updated Fixed-Pattern Noise (FPN) correction of pixel-by-pixel FPN correction term; read the temperature sensor; interpolate data from a data set of pixel-to-pixel variations, the closest value to the data set corresponding to both the ambient and black-body temperature corresponding to the actual temperature sensor reading; and use the derived data set as at least one of the gain and offset correction of the image frame or the initial FPN correction term. In some embodiments, the thermal imaging system is further configured to scale and normalize the data set.

In some embodiments, a micro-core further comprises an electromechanical actuator between the lens and the lens holder configured to impart motion to at least one of the lens or the micro-core to cause the FPN term to update if the thermal imaging system acquired images are not continuously subject to motion. In some embodiments, the imparted motion is used to develop sub-pixel resolution.

In another embodiment, a thermal imaging micro-core comprises a substrate; a thermal imaging Focal Plane Array (FPA) bonded to the substrate; at least one optical element; an optical housing coupled to the at least one optical element, the optical housing bonded to the substrate such that the at least one optical element is disposed to expose the FPA to external scenes; a circuit element coupled to the substrate and configured to provide one or more electrical connections between the FPA and a host system; and an oscillator circuit configured to set the frame rate of the FPA, the oscillator circuit mounted to the circuit element, wherein at least a portion of the oscillator is disposed between the circuit element and at least a portion of the housing such that the housing prevents removal of the oscillator circuit from the micro-core.

In another embodiment, a method of displaying fused data from a thermal imager and a visible imager imaging at least partially the same scene comprises: extracting edge information from the visible image; selecting a color table for display of the thermal image; and blending the visible edge data with thermal image data for corresponding scene pixels according to a blending coefficient, wherein the blending coefficient is automatically chosen based on the thermal color table selected.

In another embodiment, a method for correcting for offset drift in a thermal imager including a focal plane array (FPA) of photodetectors, including a FPA ambient temperature sensor configured to observe a thermal scene and convert the thermal scene information to a plurality of image frames whose pixels correspond to individual photodetectors in the array, comprises: providing a non-uniformity correction in the form of an offset value from a desired value for at least one pixel at a given FPA ambient temperature; updating the non-uniformity correction at at least one different FPA ambient temperature; developing a relationship between offset variation and temperature sensor reading; using the relationship to apply an offset correction derived from the temperature sensor reading to image data during imaging operation of the thermal imager.

In some embodiments, the non-uniformity correction is performed by a calibration operation that is part of the initial testing of the imager. In some embodiments, the offset correction is based on an offset collection operation performed at manufacturing testing, and wherein the relationship is stored for use during operation. In some embodiments, the offset correction is determined at a discrete number of temperature sensor readings and the relationship is a curve fit to the offset correction data points. In some embodiments, the offset correction is performed during actual use of the imager and is used to update or replace any preexisting offset drift correction data. In some embodiments, the offset correction is performed during operation of the imager by: observing a flat scene at a first temperature sensor value and determining a NUC offset data set; observing the flat scene at at least one different temperature sensor value and determining the difference in offset data set; developing the relationship from the operationally observed flat scenes at different FPA temperature and apply offsets derived from the relationship at other temp sensor readings. In some embodiments, the imager is directed at a flat scene by a user and the offset correction is initiated by an input from the user. In some embodiments, the imager detects a flat scene is being imaged and initiates the offset correction. In some embodiments, observing the flat scene at at least one different temperature sensor value comprises, responsive to an initiation of the offset correction and subsequent to observing the flat scene at the first temperature sensor value, initiating at least one of power saving or power using operations, wherein an increase or decrease in resistive heating associated with the power saving or power using operations at least partially causes a local ambient temperature change from a first temperature associated with the first temperature sensor value to a second temperature associated with the different temperature sensor.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure

FIGS. 8A and 8B show an exemplary sub-panel for testing and adjusting micro-cores.

FIGS. 15A, 15B, and 15C illustrate operational concepts for a core with a shutter.

FIGS. 16A and 16B illustrate examples of offset drift and correction for shutterless systems.

DETAILED DESCRIPTION

Figure 1A:
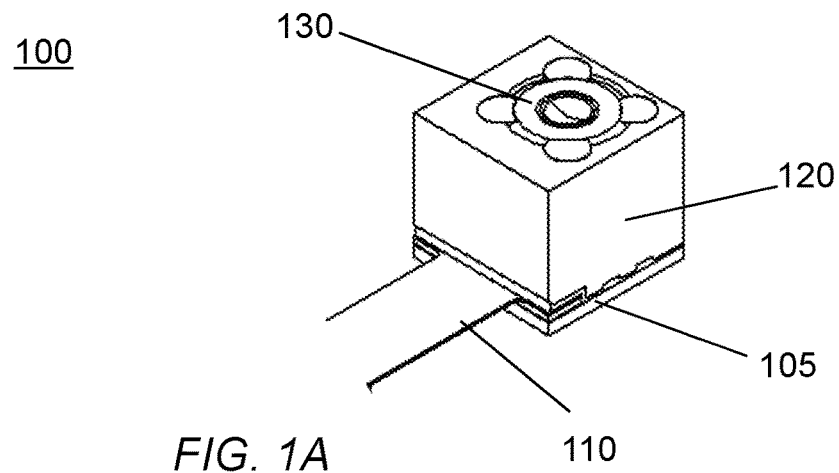
FIGS. 1A, 1B, 1C, and 1D show the general elements of an illustrative thermal imaging core.

The disclosed processes and calibrations disclosed herein may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer executable instructions may be implemented along with discrete circuit components to carry out one or more of the methods described herein. In certain implementations, the disclosed methods may be implemented in conjunction with one or more focal plane arrays (FPA) on a camera core, wherein the processor and memory components executing the disclosed methods may be on a processing device integrated to the camera core, such as a mobile appliance including smart phones, tablets, personal computers, etc. In some implementations, the processing and memory elements of the imaging system may be in programmable logic or on-board processors that are part of the core or camera system. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a thermal imaging focal plane array (FPA) configured to acquire images of a scene. The FPA can include a two-dimensional array of N detectors, configured to output a two-dimensional image of the scene. For imaging purposes, image frames, typically data from all or some of the detectors $N_f$, are produced by the FPA where each successive frame contains data from the array captured in successive time windows. Thus, a frame of data delivered by the FPA comprises $N_f$ digital words, each word representing the signal of a particular pixel $S_{x,y}$ in the image. These digital words are usually of a length determined by the analog-to-digital (A/D) conversion process. For example, if the pixel data is converted with a 14-bit A/D, the pixel words may be 14 bits in length and there may be 16384 counts per word. The A/D conversion words may, in some embodiments, be encoded in formats compatible with standard fixed or floating point processing, such as 16 bits. For an infrared (IR) camera used as a thermal imaging system, these words may correspond to an intensity of radiation measured by each pixel in the array. In a particular example, for a bolometer IR FPA the intensity per pixel usually is related to the temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a micro-electrical mechanical system (MEMS) device, may be manufactured using a MEMS process. The associated ROIC, however, may be fabricated using electronic circuit techniques. These two components can be combined to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

In general, the present disclosure relates to small thermal imaging modules or micro-cores, such as modules intended for internal installation in smartphones or other personal electronic devices (PED's), as well as other small devices such as very small security cameras or environmental monitoring cameras. The system in which the core is installed will be the host system, and the combination of the core with the host or hosts will comprise a complete thermal imaging system. These thermal imaging camera cores are intended as modules that can integrate with systems or devices already having one or more of processing, display, user interface, and other such functions. As such these micro-cores may be analogous to the visible camera modules commonly made for integration with PED's, in that they are compatible with physical integration and receive power/control signals from the device with which they are integrated, and provide image data to the device for display or other image processing.

Cores intended for such use may be very small, inexpensive, and producible in volumes unprecedented in the thermal imaging field. Producing a thermal imaging micro-core on such a size scale, and with the production volume required for inclusion within the housing of a smartphone, requires many innovative features in the structural design, adjustment setup, testing, and actual operation. Among these innovations is a thermal design that maintains adequate thermal performance in an ultra-small unit. Optical adjustment, such as focus adjustment, must be accomplished in bulk and at high speed. Testing must be comprehensive to ameliorate the lack of design flexibility in an ultra-small unit—basically each unit must be fully characterized over the expected ambient and scene temperature requirements rather than relying on designed-in mitigation of thermal and environmental effects, as is possible in larger units. The operational aspects of such a core face challenges as well, such as the difficulty of including typical design features such as shutters for non-uniformity correction (NUC). The lack of a shutter may lead to increased need for system characterization as well as innovative operational concepts. As such, comprehensive testing may need to be accomplished at very high throughput, and various production steps may also need to be accomplished at very high throughput. For example, fixing the separation between a lens and an imaging array during manufacture for a small form factor thermal imager may also need to be accomplished quickly and at low manufacturing cost.

One or more embodiments may provide for an extremely small thermal imaging core, or micro-core. Advantageously, such a micro-core may provide the capability to add thermal imaging to PED's such as smartphones, or other small devices such as very small security cameras or environmental monitors.

One or more embodiments may provide for efficient and inexpensive manufacture and test of extremely small thermal imaging cores, or micro-cores. Advantageously, this could lead to the volumes and price points suitable for inclusion in PED's such as smartphones.

One or more embodiments may provide for advanced thermal design of extremely small thermal imaging cores, or micro-cores. Advantageously, this may compensate for thermal imager design elements not practical for very small cores.

One or more embodiments may provide for low cost of manufacturing that achieves desirable imager focus. Advantageously, the processes may be compatible with cost-effective high speed manufacturing use while providing accurate and reliable focusing.

One or more embodiments may provide for a manufacturing focus setting process that is applicable to both fixed-focus and variable-focus systems. Advantageously, an optimized initial focusing may be achieved for both types of systems.

One or more embodiments may provide for a complete calibration of every core. Advantageously, this may compensate for thermal imager design elements not practical for very small cores.

One or more embodiments may provide feeding forward calibration data for every core to actual operation of the core. Advantageously, this may compensate for omitting common thermal imager design elements which cannot be practically included in very small cores.

Figure 1B:
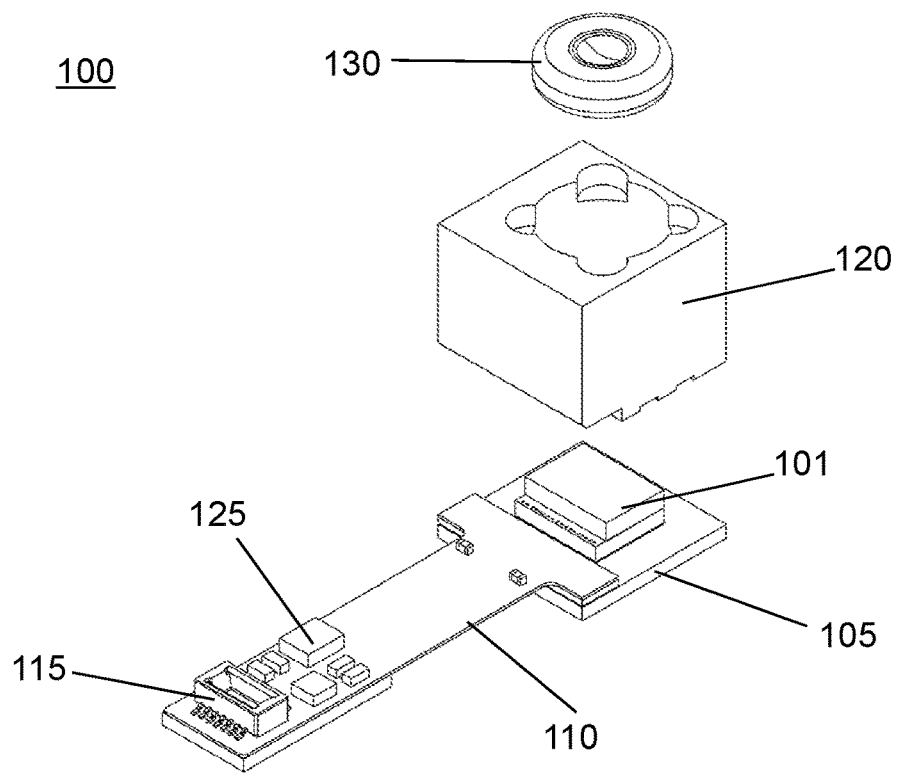

Referring to FIGS. 1A and 1B, the general elements of a thermal imaging module, or micro-core 100, are shown. FIG. 1B is an exploded view of the thermal imaging module, or micro-core 100, of FIG. 1A. Examples of the various hardware and digital logic/programming elements for thermal imaging systems are variously disclosed in U.S. patent application Ser. No. 14/829,500, filed Aug. 18, 2015 (now issued as U.S. Pat. No. 9,584,750), U.S. patent application Ser. No. 14/292,124, filed May 30, 2014, U.S. patent application Ser. No. 14/829,490, filed Aug. 18, 2015 (no issued as U.S. Pat. No. 9,595,934), U.S. patent application Ser. No. 14/817,989, filed Aug. 4, 2015 (now issued as U.S. Pat. No. 9,727,954), U.S. patent application Ser. No. 14/817,847, filed Aug. 4, 2015 (now issued as U.S. Pat. No. 9,930,324), U.S. patent application Ser. No. 14/244,533, filed Apr. 3, 2014 (now issued as U.S. Pat. No. 9,684,153), U.S. patent application Ser. No. 14/817,689, filed Aug. 4, 2015 (now issued as U.S. Pat. No. 9,798,220), U.S. patent application Ser. No. 14/817,730, filed Aug. 4, 2015, U.S. patent application Ser. No. 15/629,526, filed Jun. 21, 2017, and US Pat. App'n No. 62/436,694, filed Dec. 20, 2016; all owned by the assignee of the current application and each of which is incorporated by reference herein in its entirety. These referenced applications describe a variety of imaging system configurations and various techniques for adjusting for artifacts and correcting for degradations in image quality that arise at least in part due to various properties and characteristics of the imaging systems.

Optics, shown as lens 130 held in lens housing 120, but may include other optical elements, is configured to capture infrared radiation from an external scene and focus the radiation on FPA 101. FPA 101 typically includes a square or rectangular array of IR photodetectors and some level of electronics configured to convert the captured radiation to electrical data, typically a digital data stream representative of an image of the scene. In the exemplary micro-core 100 shown, FPA 101 is bonded onto substrate 105. Housing 120 with lens 130 is also bonded onto substrate 105, with the lens 130 disposed to capture and focus light onto FPA 101. In an embodiment intended for installation in a smart phone, it is important to understand that the longest dimension practical for the housing-lens-FPA substrate assembly may be considerably less than an inch, and possibly the requirement may be less than 0.5" or even less than 0.3". These dimensions are very small by thermal imaging standards.

For such a small camera core, thermal considerations, which are always a concern for thermal imagers as described in the incorporated references, may be especially critical. Thus, novel design features may be necessary. For instance, the FPA and lens may need to remain at a fixed distance, which is difficult for such a small device where even small temperature induced dimension changes would be enough to affect imager performance Thus, in the embodiment shown, substrate 105 is chosen to thermally match FPA 101. Although any combination of thermally matched materials would be beneficial, as described in the incorporated references, FPA 101 may be an array of microbolometer radiation detectors fabricated onto readout electronics to form the FPA. FPA 101 may, for many embodiments, be fabricated from a silicon wafer. Choosing a segment diced from a silicon wafer as the material choice for substrate 105 achieves both a strong material and thermal match between the substrate and FPA. This choice for substrate 105 has proven to be very beneficial.

Housing 120 may be fabricated from a variety of materials such as aluminum or zinc alloys. Suitable low reflectivity coatings may be applied to the housing 120 to mitigate stray light effects within the lens housing. Lens 130 may be produced from a variety of material suitable for thermal wavelengths, such as chalcogenides, sapphire, and others. For instance, lens 130 may be a molded chalcogenide lens in some embodiments, sized just smaller than the housing surface dimensions.

Also attached to substrate 105 is a circuit element 110, disposed to connect FPA 101 to connector 115. The connections may be required to be flexible, so in some embodiments the circuit element 110 is a flexible printed circuit (flex circuit). In other embodiments, the circuit element 110 may be a printed circuit board (PCB) or other circuit structure. In the simplest embodiment, circuit element 110 may be a flex circuit bonded to substrate 105, and connections from pads on the flex circuit to pads on the FPA may be made by wire bonds. Even in this configuration all assembly may accomplished with pick-and-place and bonding equipment compatible with smartphone manufacturing. In more complicated embodiments, substrate 105 may be fabricated with pads and circuit traces configured to solder and/or make bump connections between the FPA 101, substrate 105, and circuit element 110 so that assembly automation may be even further enhanced.

Circuit element 110's exact configuration will depend on each host system's installation requirements, and thus is shown as open ended in FIG. 1A. For some installations connector 115 may be chosen to be compatible with internal smartphone conventions. Typically, such a connector will carry standard power connections and connections for some sort of communications protocol such as SPI, USB, or a direct connection to a host system processor. Thus, some circuitry may be required on core 100. In one embodiment, circuitry 125 is placed on the connector end of the flex circuit 110 for thermal reasons. Circuitry may include power conditioning and a clock generator such as an oscillator circuit. FPA 101 may be configured to support the required communications protocol, both in terms of accepting commands for configuration and operation, as well as providing image data outputs. Alternatively, a communications processor may be installed as part of circuitry 125 to interface between the FPA and a standard internal communication bus like SPI, USB, or others. As stated above, in the simplest case, the FPA 101 will be interfaced through a connector or direct wiring to host processor I/O. For some PED embodiments, the length of the circuit element 110 with connector 115 may be less than 1.5".

As stated above, the FPA 101 may communicate with the host system controller in a variety of ways. The design considerations as to how to implement the communication may depend on the degree of customization inherent in the integration of the micro-core 100 with the host system. On the highly customized end of the spectrum, the control and power lines for the FPA 101 may be brought out and interfaced directly to host controller I/O and to the host system power supply. This will require that the host controller be specifically configured to directly control the FPA 101. On the other end, the micro-core 100 may be designed to accept a standard communication and/or power protocol, such as SPI, USB, or manufacturer specific busses such as those used by Apple, Samsung, and others. In this case, at the very least, a communications processor and possibly power conditioning elements (regulators, filters and the like) may be required on the micro-core 100. In the most highly modular case, the micro-core 100 may include processor(s) and memory for performing some or all of the image processing and image acquisition functions, and in particular, include memory for calibration data. These additional processor, communications, and memory components could be integrated as external components onto the flex circuit or other circuit element 110, or substrate 105. It is also possible to fabricate such components as part of the FPA 101 since the FPA 101 will usually be microfabricated using silicon or other semiconductor processing that may be compatible with memory, processor, and other digital/analog circuitry. It may also be possible to fabricate the photodetector and associated interfaces at one set of fabrication design rules (e.g. linewidths in the 100s of nanometers) while fabricating the processor/memory portion at much smaller design rules (e.g. sub 100 nm linewidths) to improve performance and reduce power consumption.

Figure 1C:
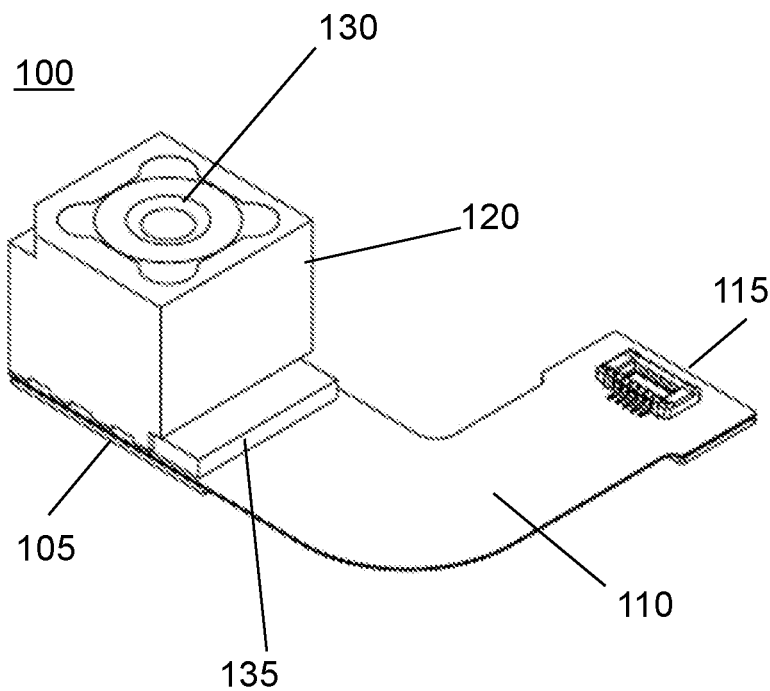
Figure 1D:
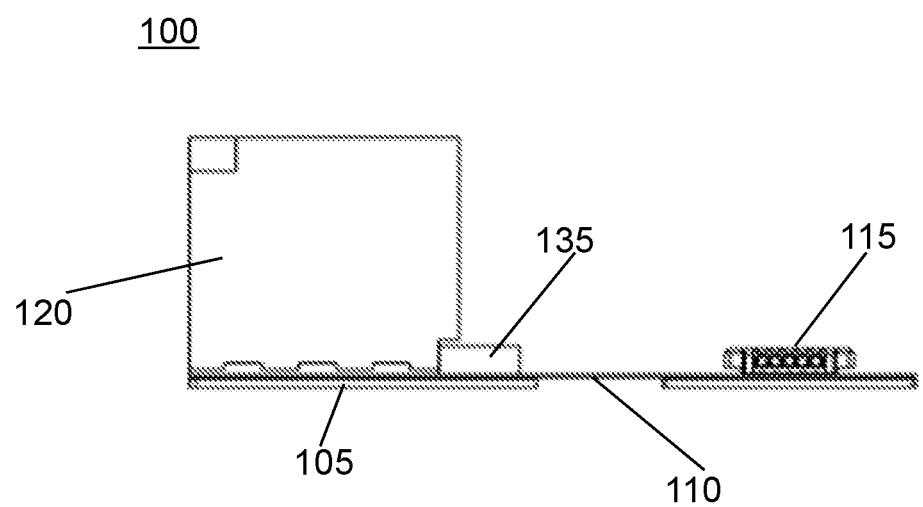

FIGS. 1C and 1D illustrate another embodiment of a micro-core 100. By way of showing alternative arrangements, in the embodiments of FIGS. 1C and 1D circuit element 110 is shown as being curved instead of straight. However, any of the embodiments shown in FIGS. 1A-1D may equally be implemented with a curved or straight circuit element 110. Such an arrangement is sometimes utilized for camera units integrated into devices such as smartphones, tablets and the like.

One of the challenges involved in bringing thermal imaging capability to widespread consumer use is that high frame rate thermal imaging is considered technology relevant to National Security in the United States. Therefore, in order for a thermal imager to be granted an export license, the frame rate, i.e. images per second, must be less than 9 Hz, and must not be practically modifiable to exceed 9 Hz after the device has been exported.

The frame rate is set by the timing signals used by the FPA 101 to perform the internal switching required to acquire and read out image frames. These timing signals are typically set by an oscillator circuit chip, shown as 135 in FIGS. 1C and 1D. An oscillator chip may be selected whose outputs are limited by the oscillator circuit design to operate at prescribed frequencies, such that the only way to change the frame rate of the FPA would be to change to a different frequency oscillator, i.e. to replace the actual oscillator part on the circuit element. In the embodiments shown, lens mount 120 is constructed with a cutout on one side, and oscillator chip 135 is mounted on flex circuit 110 such that when the lens mount 120 is built onto the micro-core 100, oscillator 135 is trapped by lens mount 120 and cannot be removed and changed without removing the lens mount. As will be shown below, lens mount 120 can be affixed in a permanent fashion, utilizing appropriate adhesives such that once in place lens mount 120, and accordingly the oscillator 135, cannot be removed and/or changed in a non-destructive manner. Thus the frame rate of the micro-core 100 may be set permanently at a given frequency, enabling export of the device.

Figure 2:
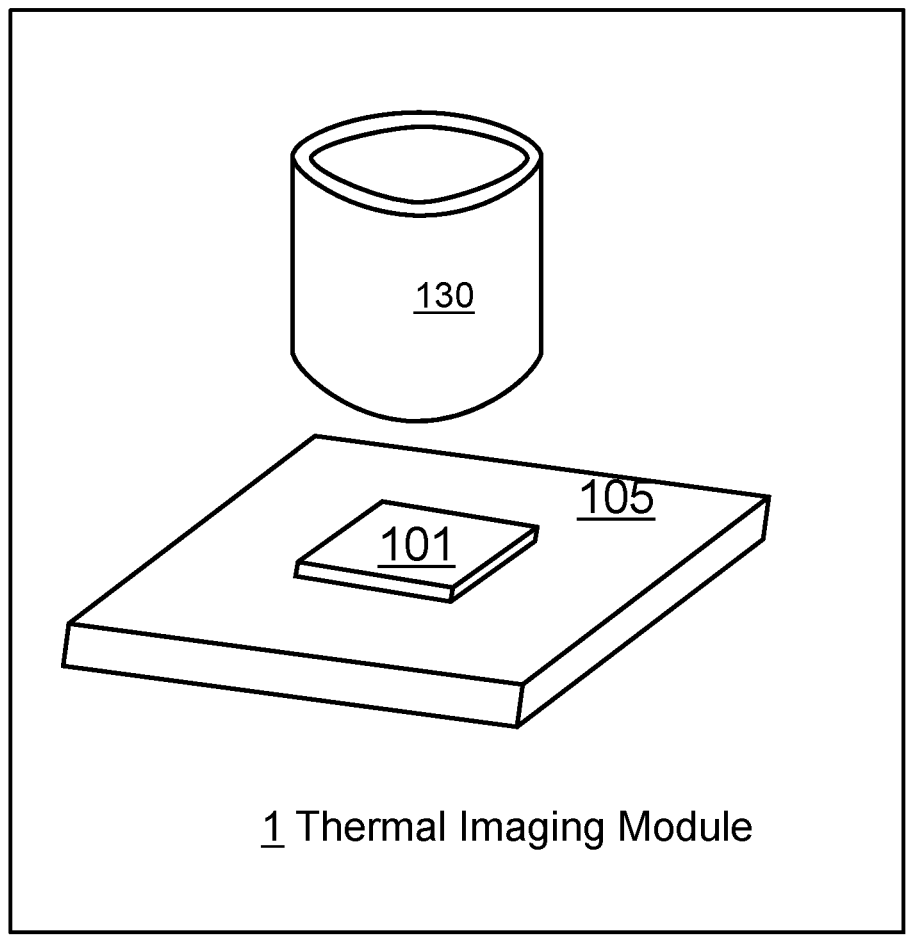
FIG. 2 shows some elements of the core arranged schematically.

FIG. 2 illustrates the basic imaging components of microcore 100. Lens (and/or other optics) 130 is held in relation to FPA 101, which may be bonded and optionally electrically connected to substrate 105, which may be in the form of a silicon wafer segment supporting the FPA as well as external connections. Such a module may include a large amount of processing on board for supporting a communications protocol, as well as image acquisition and processing, but may also rely on the host system such as a smartphone for further image processing, user interface and display.

Such a module may be packaged in a small format, suitable for installation in a variety of systems, which may benefit from adding thermal imaging capability. For example, a FPA size of ~0.25 inches on a side, with a PCB mounted lens holder of ~0.3" diameter and ~0.25" high, and a ~1.5" by ~0.3" flex circuit are realistic numbers for small thermal imaging micro-cores. Such a camera core may be readily configured to fit within many smartphones or other PED's.

The nature of lenses suitable for thermal imaging and the optical performance required differs from visible imagers, so the techniques and designs utilized for small visible imagers, such as smartphone cameras, may not be directly applicable to thermal imager designs intended for installation in small spaces. Thermal imaging lenses cannot be made from glass or most plastics and must be made from materials that tend to be bulkier and heavier than visible imaging lens materials. Because of the much longer wavelengths, fine focus requirements are less stringent than with visible imagers, so fixed-focus or limited-focus adjustment imagers are practical for many applications. Thus, techniques directly applicable to small mass-produced thermal imagers, that are cost effective for determining and setting focus at manufacture, may be desirable.

Figure 3:
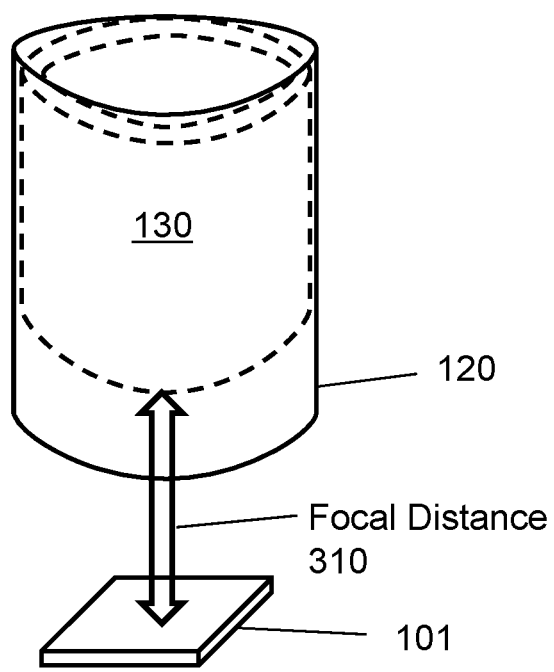
FIG. 3 illustrates a lens in a lens holder, where the position of the lens relative to the FPA determines the focus of the core.

FIG. 3 shows lens 130 in lens housing 120 at focal distance 310 from FPA 101. The lens housing will have provision for a lens holder, which may be integral to the housing or otherwise held by the housing. For fixed-focus imagers, the lens holder may be as simple as a groove or slot in the housing to which a bonding agent may be applied to fix the lens to the housing. Or the lens holder may be more complicated, such as a piezoelectric ring structure which holds the lens and is deformable to provide a fine focus arrangement, or potentially as a dithering device as will be described later in this disclosure. The lens 130 possibly with a holder attached, may be positioned within the housing by way of lens tooling, and held in place permanently within the housing when a bonding agent is applied to the lens housing 120 and either directly to the lens 130, or applied to a lens holder attached to the lens. Or Lens 130 may be fixed within housing 120 and housing 120 may be positioned relative to FPA 101.

Figure 4:
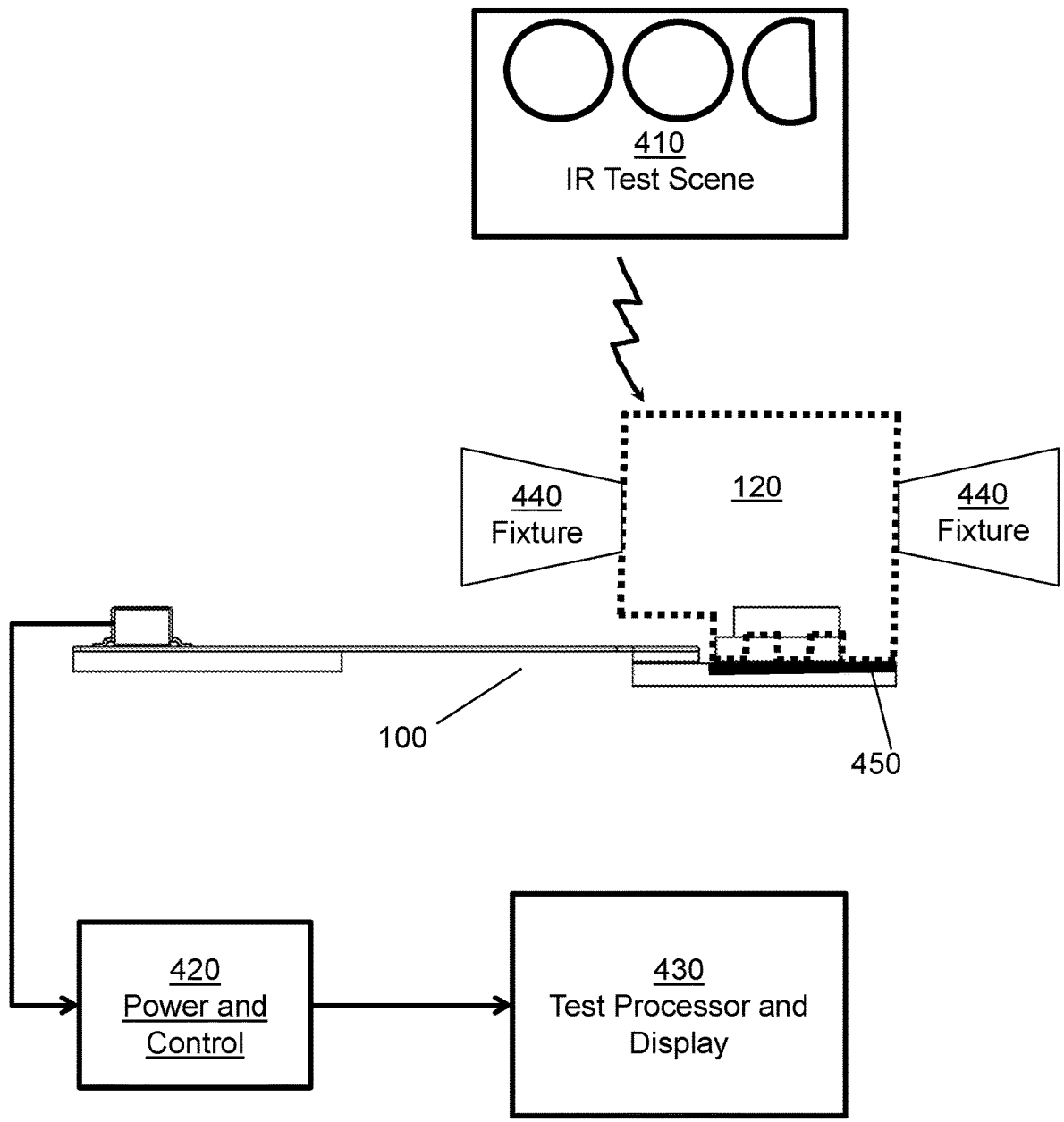
FIG. 4 shows schematically an exemplary focusing setup.

FIG. 4 illustrates one approach to setting the focus of micro-core 100 during manufacture relying on positioning the housing 120. The micro-core 100 may be mounted to a test fixture that includes power and communication interface 420, analogous to the interface available in the intended host system such as a PED. There may also be a test processor and display 430 which will control the core 100 and acquire image data. The housing 120 may not be attached at the start of this operation but may be held positioning fixture 440. Micro-core 100 may be exposed to test scene 410 and the image of test scene 410 will be observed and or displayed by test processor and display 430. Fixture 440 may position housing 120 vertically until optimum focus is achieved. Optimum focus may either be observed manually or by way of automatic focus logic or programs executing on test processor and display 430. At the point of optimum focus, housing 120 may be bonded in place to module 100, using a bonding agent such as glue, epoxy, rubber sealant, spot welds or others. In one embodiment the bonding is by way of a glue and/or epoxy line 450, which is either applied at the point of achieving focus, or applied uncured before the housing 120 is brought to the rest of the module, and cured after focus is achieved. In either case a provision for curing dimension change of the glue line may be factored into the positioning.

The lens 130 may be placed in the lens housing 120 and the housing 120 placed on the substrate at a predetermined position corresponding to the designed focal distance 310 to the FPA 101. In practice, an adjustment to the actual focal distance 310 of approximately greater than 10 microns and possibly greater than 50 microns, but usually less than 100 microns may be required to achieve good image quality for a small thermal imager.

The entire process may be automated, including the application of the bonding element, the determination of optimum focus distance, the curing of the bonding element, if required, and any positioning of the micro-core 100 and/or the target test scene.

Since the focus fixture of FIG. 4 includes all the elements needed to power and access image data from the micro-core 100, it may be desirable to implement other functions into the focus operation. For instance, test scene 410 may include an edged target for focus adjustment, but also include one or more flat-field scenes at one or more temperatures. Edged or patterned targets may also be used to make a Modulation Transfer Function (MTF) measurement. Adding these additional scenes may allow for other micro-core set-up operations such as setting the integration time for FPA internal data acquisition operations.

Figure 5A:
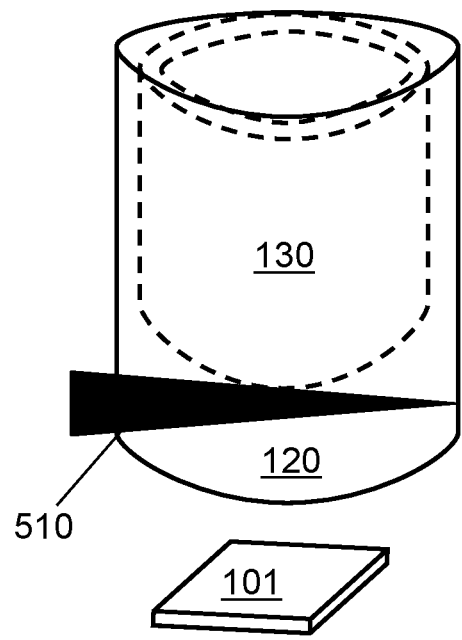
FIGS. 5A, 5B and 5C illustrate a tapered shaft positioning element embodiment.
Figure 5B:
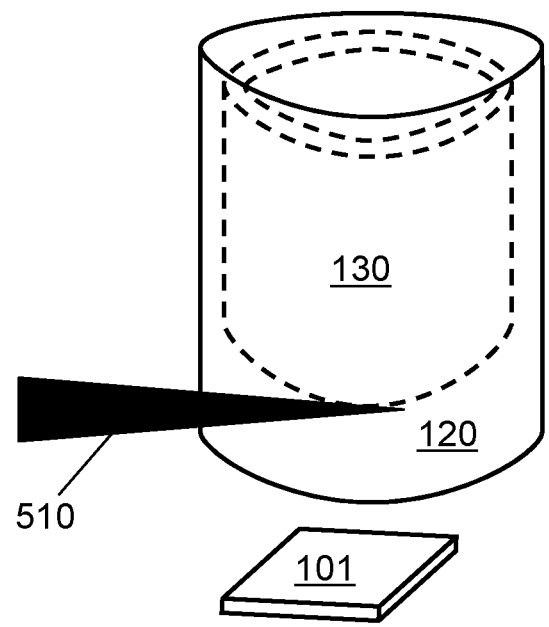
Figure 5C:
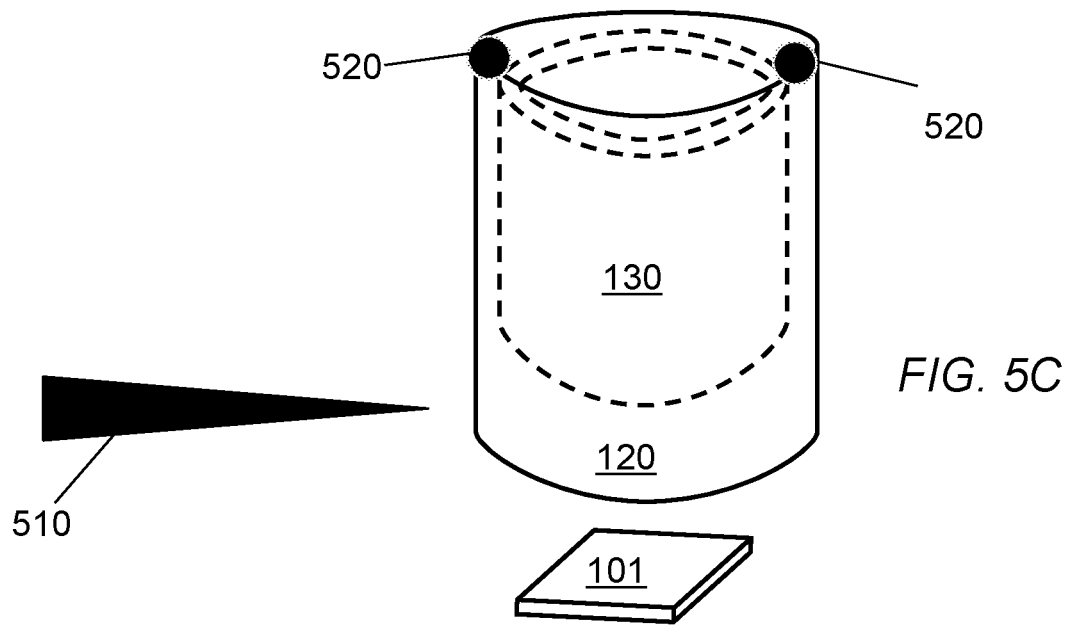

FIGS. 5A, 5B, and 5C show an embodiment for a manufacturing process that achieves the above range of focus adjustment in a simple and cost-effective manner for the case where the housing is fixed and the lens itself is positioned for focus adjustment. The figures show a positioning element 510 which acts as a physical stop to lens 130. Element 510 is inserted, substantially perpendicularly into lens housing 120 in a removable manner In the embodiment shown, element 510 is a tapered shaft. Exemplary requirements for the tapered shaft may be that the taper be enough to cause at least a 50-micron difference in positioning and that the width or diameter of the shaft leave a significant portion of the lens unblocked, i.e. only blocks a portion of the FPA 101 field-of-view (FOY).

Lens tooling, not shown, can push lens 130 into housing 120 up against element 510. This provides a temporarily stable position of lens 130. Element 510 may be drawn out or in to change this temporarily stable position. FPA 101 may be powered and connected to a display or image acquisition system as in the embodiment FIG. 4. The tooling may be designed to expose the imager to a suitable test pattern. The resulting image may be analyzed for sharpness. This analysis could be visual or could be an automated process such as an edge quality algorithm executing on image acquisition elements. The point of optimum image sharpness is reached by drawing out and/or in element 510 while observing the image, and the lens and/or lens holder may be permanently fixed to the housing with bonding agent 520. At that point element 510 may be removed and the imager will remain permanently focused.

Element 510 need not be a difficult item to produce. For instance, in some embodiments element 510 may be a standard sewing needle. A sewing needle is typically quite stiff and more than strong enough to provide an adequate resistance to suitable tooling. Standard Needles taper from a very sharp (less than 10 micron) point to the full diameter of a few hundred microns for the smallest gauges. The diameter would only block a small portion of a typical FPA. Since the taper is over the very end of the needle, a hole slightly greater than the needle gauge in the housing would provide a stable configuration. Of course, more complicated directly tailored devices could be made such as tapered rectangular shafts or custom designed needle-like objects.

The process disclosed is an extension of what is required to place the lens and bond it into position. Tooling may be required to handle the lens and place it at a desired position, and then apply a bonding agent, such as glue, epoxy, rubber sealant, spot welds or others, once the lens is placed. Adding access for a positioning element used as a movable stop is a reasonable extension of the manufacturing tooling required to meet the basic manufacturing needs for such an imager. Mating the lens tooling with a test fixture allowing for placement of an imageable test pattern and operational interface to the FPA is also a reasonable extension of the basic manufacturing capability. Automated or manual focus optimization residing in a test computing device interfaced to the FPA during the process is also within the capabilities of suitable manufacturing entities for such an imager.

Figure 6A:
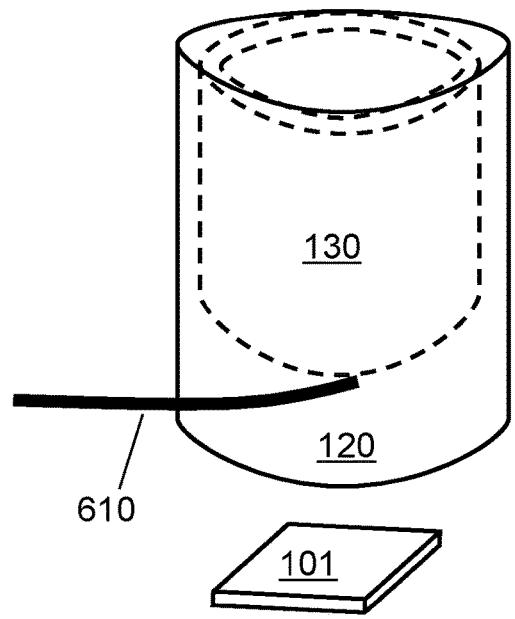
FIGS. 6A, 6B and 6C illustrate a spring positioning element embodiment.
Figure 6B:
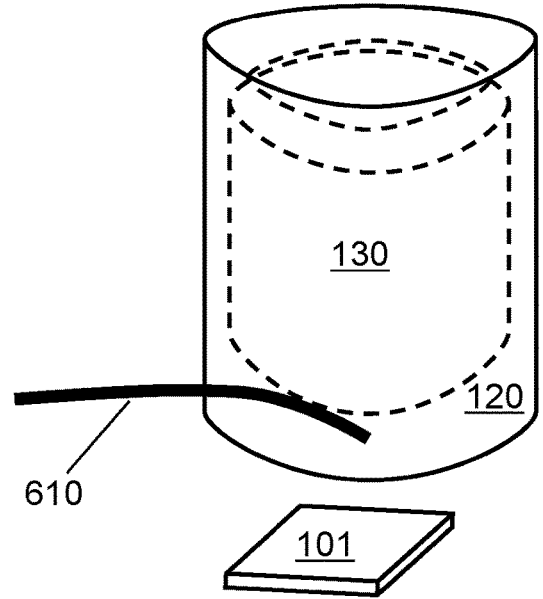
Figure 6C:
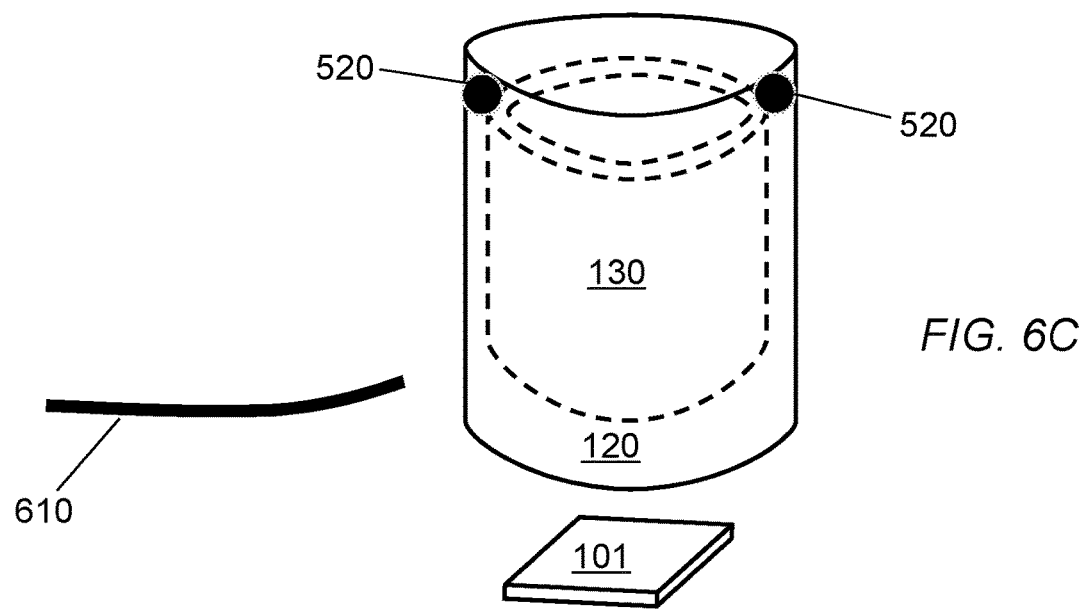

FIGS. 6A, 6B, and 6C show an alternative embodiment. In this case, positioning element 610 is a spring inserted into lens holder 120. Lens 130 is pushed against spring element 610 by tooling (not shown). The balance of the tooling pushing against the opposing spring force defines a temporary stable position which may be changed by varying the pushing force. FPA 101 may be powered and connected to a display or image acquisition system. The tooling may be designed to expose the imager to a suitable test pattern. The resulting image may be analyzed for sharpness. This analysis could be visual or could be an automated process such as an edge quality algorithm executing on image acquisition elements. The point of optimum image sharpness is reached by increasing/decreasing the pushing force while observing the image, and the lens and/or lens holder may be permanently fixed to the housing with bonding agent 520. At that point element 510 may be removed and the imager will remain permanently focused.

In some cases the lens may be held by an element, such as a piezoelectric ring, under system control that may further change the focal distance. For this case, the disclosed process could be used to set the basic focal distance, which may be later adjusted under user control during imager operation.

Figure 7:
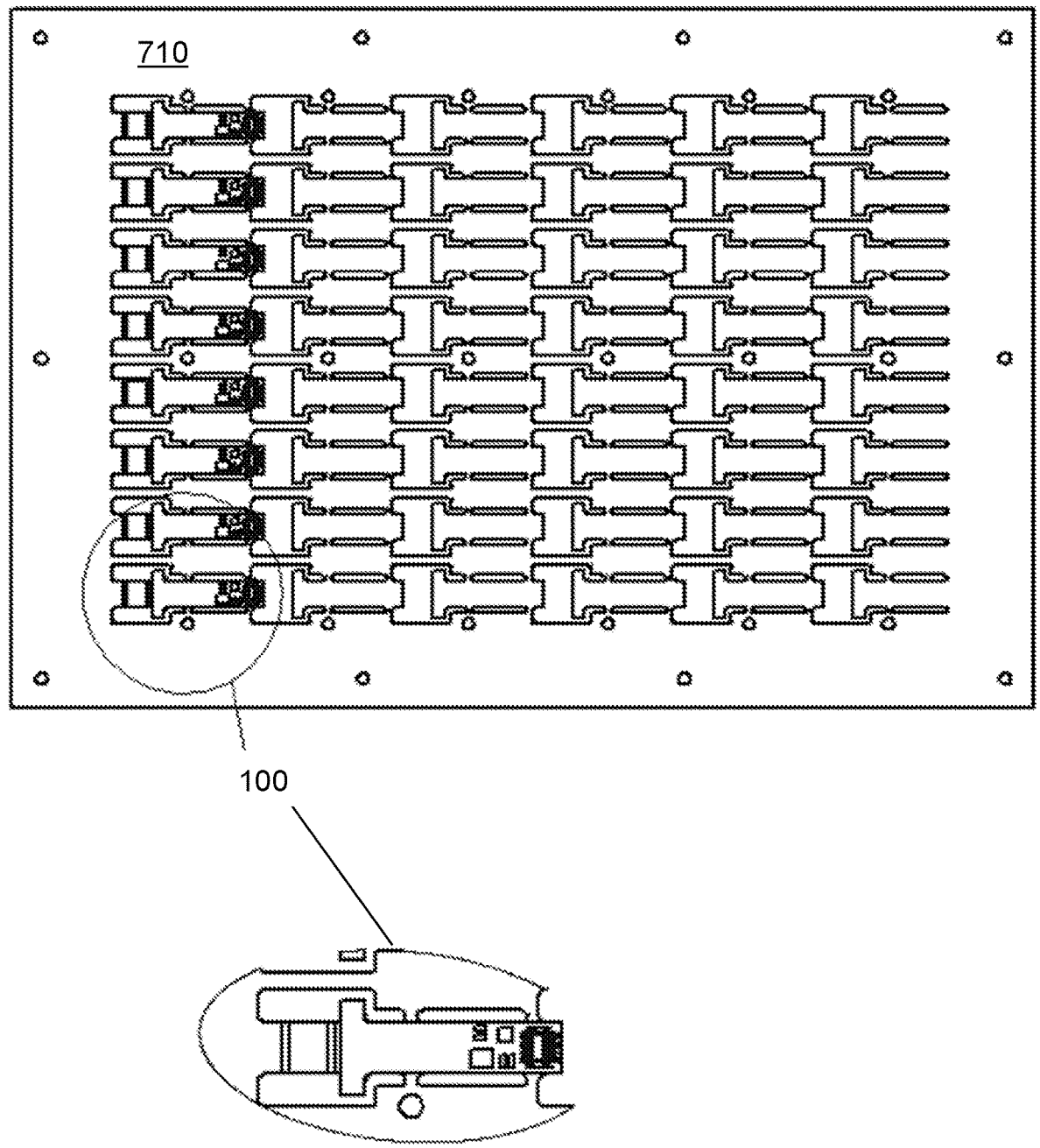
FIG. 7 shows an exemplary panel for producing micro-cores.

In order to achieve production rates suitable for the volumes found in the PED market, it may be desirable to manufacture and execute set-up operations, such as setting focus and performing calibration, in bulk. Thus, it may be desirable to attach the building blocks for the core 100 to a panel 710 holding a plurality of cores 100, as shown in FIG. 7. In this embodiment, the core elements could be placed and bonded, and even wire-bonded, in bulk using specially configured manufacturing equipment such as currently used in PED and other high-density electronic device manufacturing.

The ideal of panelizing the cores also applies to test and calibration operations, but the panels may be cut into smaller segments 810 as shown in FIGS. 8A and 8B. For instance, the focus fixture may be designed to hold a panel of micro-cores and include positioning elements as required.

As discussed above, thermal imaging systems, particularly microbolometer based inexpensive mass-market oriented systems, are susceptible to a wide range of effects that affect image quality and thermographic accuracy. In particular, the conversion of image signal to image temperature, i.e. thermography, may be affected by both scene signal amplitude, i.e. scene temperature, and the ambient temperature the imaging sensor, i.e. FPA, is exposed to. The effects of scene and ambient temperature may vary from device to device, and the variation may be present at all levels of the system, including pixel-to-pixel variation within an individual unit, unit-to-unit variation within a given design, and from design to design. Higher cost imaging systems may provide more tools to mitigate these effects, such as means for sensor ambient temperature control, and controlled or known temperature calibration devices, such as temperature controlled or temperature monitored shutter flags. The present disclosure is directed to a micro-core with limited tools for mitigation of temperature effects.

The present disclosure assumes an imaging system with an integral ambient temperature sensor of a simple inexpensive implementation. Accordingly, the integral temperature sensor may be, but not necessarily, directly connected to the FPA. What is important is that a signal related to operational ambient temperature may be measured during actual use of the micro-core, and that this measured ambient temperature be correlated to the temperature of the photodetectors on the FPA. The temperature sensor performance may vary from unit to unit and may itself require calibration on a per unit basis. The thermography process of the present disclosure makes use of the temperature sensor, as well as data acquired at various stages in system manufacturing.

Figure 9:
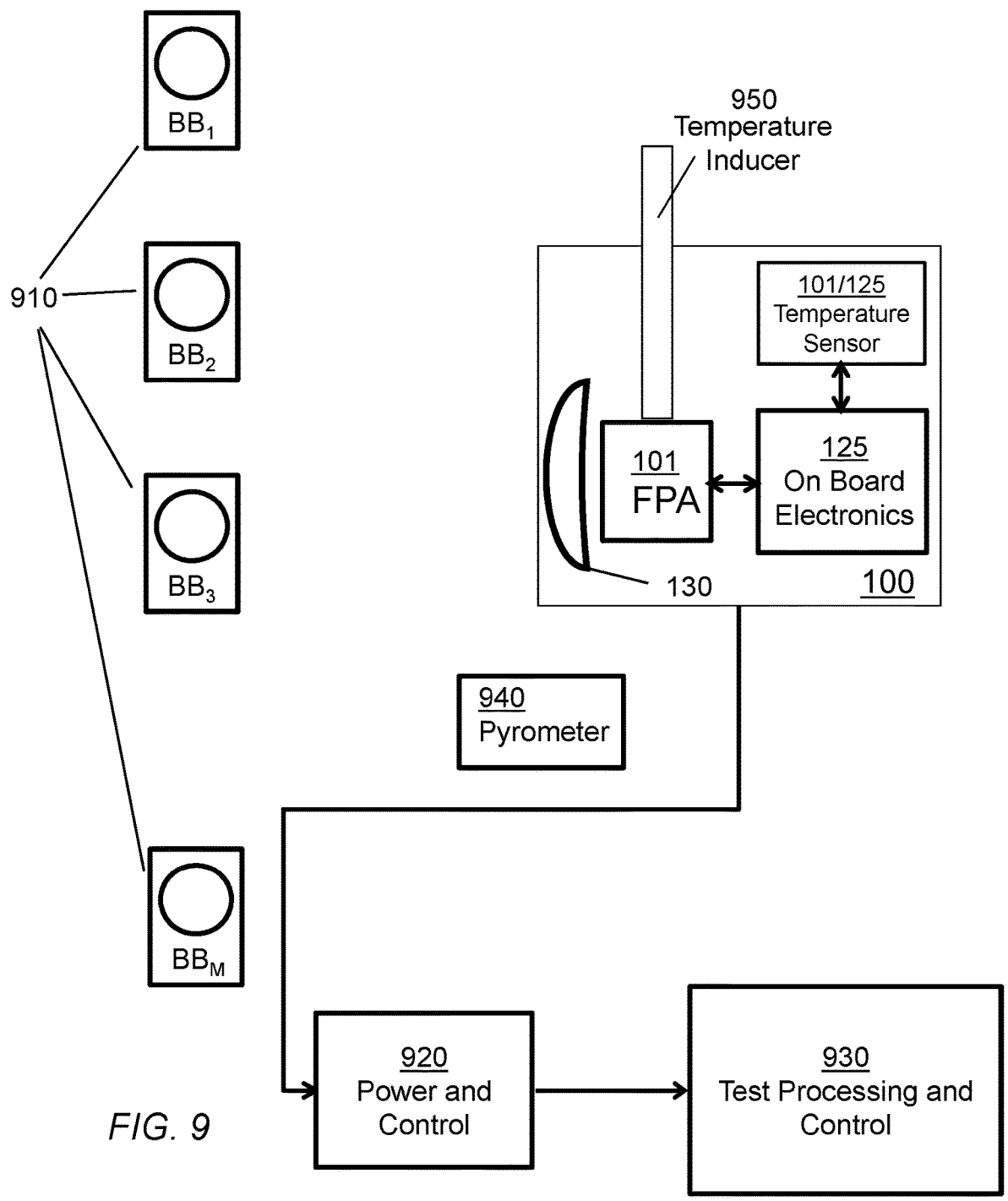
FIG. 9 shows schematically a test set-up for micro-cores.

FIG. 9 illustrates schematically a thermography calibration test that fully calibrates each micro-core and generates calibration data that is stored on or provided with the micro-core to be used in camera operation, either by the core itself or the processor(s) interfaced to the core in the host system. The micro-core 100 of the current disclosure is small and therefore of limited thermal mass, and may therefore be particularly susceptible to temperature effects. It also, for many applications, may not include a shutter, which complicates the mitigation of temperature effects. As such, very complete characterization of the micro-core 100 at system test may help ameliorate for these design challenges.

The complete testing is envisioned to be performed with multiple scene temperatures and at multiple controlled ambient FPA temperatures. In the example test setup of FIG. 9, multiple scene temperatures are produced with several temperature controlled black-bodies 910, each set at a different temperature covering a range of expected scene temperatures. For instance, in an example test setup, six black-bodies (M=6 in the Figure) covering a possible temperature range from 0° C. to 500° C. may be used. In the example test setup the black-bodies are in a normal room temperature environment, so particularly for lower than room temperature settings (where condensation or frosting may occur), the actual black-body surface temperature may not correspond to the setting. Therefore, the black-body surface temperature could be monitored with a pyrometer 940, and the pyrometer value may be used for the scene temperature. Different micro-core host systems may require different scene temperature ranges, but the example test set-up provides multiple scene temperature data points for any range achievable by the black-bodies.

The calibration test may also entail multiple controlled imaging sensor ambient temperatures. In the example setup of FIG. 9, core 100 is mounted on a temperature inducer 950, such that a temperature controlled heatsink is in contact with the core substrate, and configured to view each black-body 910 sequentially. FPA and/or module 100 needs to have an on-board temperature sensor (as stated above) for monitoring or measuring a temperature indicative of the FPA temperature. The inducer may be configured to cover a temperature range compatible with the host system. For example, a typical smartphone may be designed to operate over a temperature range of 15° C. to 50° C. The inducer may subject the core being tested to a plurality of ambient temperature data points, either in discreet steps or by sweeping the temperature. However the scene temperatures and/or the ambient temperatures are controlled and sequenced, the desired result is each bolometer in the FPA images multiple black-body temperatures while operating at multiple operating FPA temperatures.

For each scene temperature at each ambient temperature, the actual known scene temperature is stored in a data set with the known scene temperature corresponding to the temperature sensor value corresponding to the induced FPA temperature. The value of the ambient temperature sensor, $T_{sens}$ should vary with ambient temperature in a way that carries forward into operational use of the micro-core.

Figure 10:
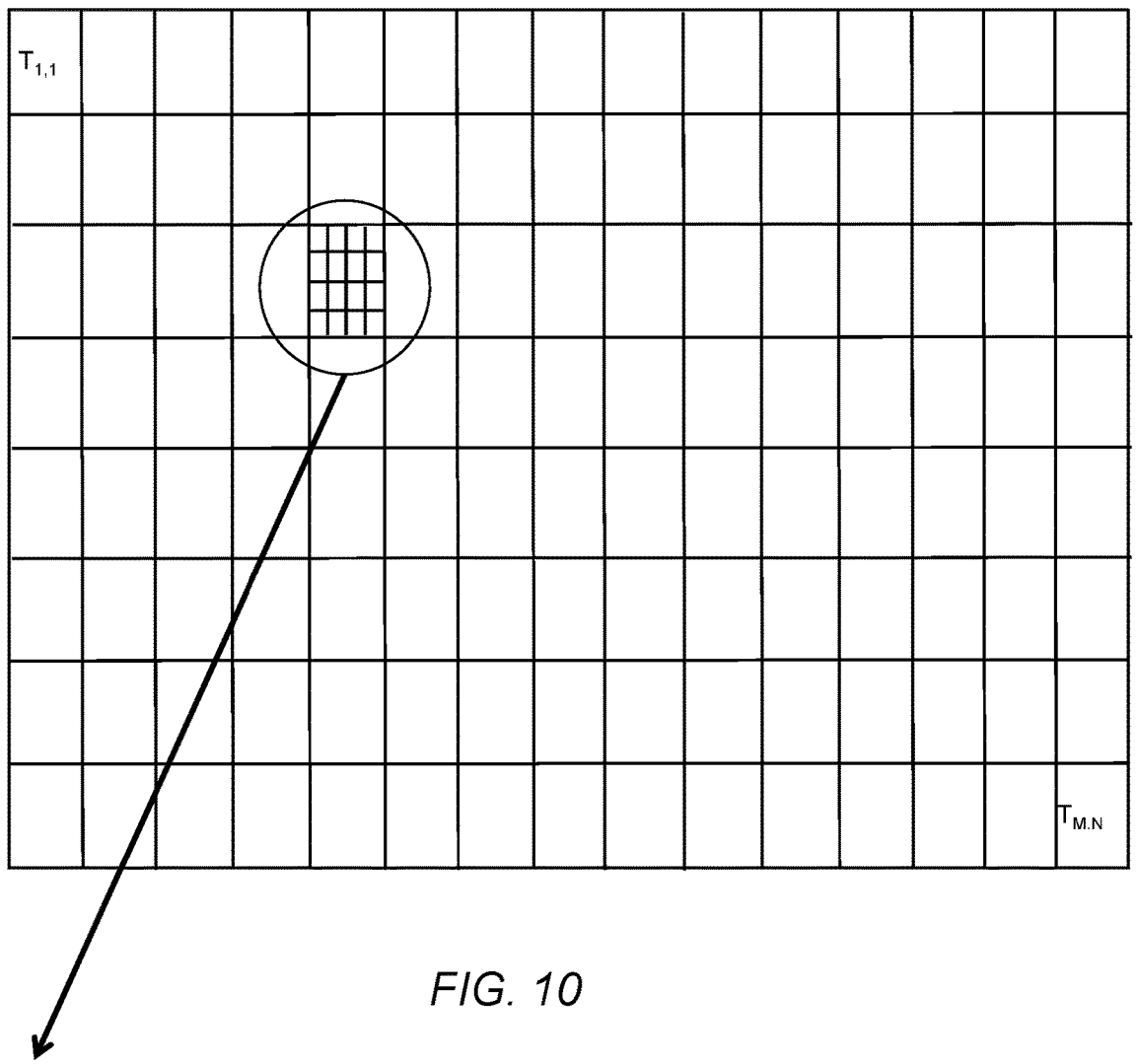
FIG. 10 shows exemplary test data.

Accordingly, series of data sets as shown in FIG. 10 are created for image pixels, for each black-body/ambient temperature combination, the ambient temperature data corresponding to the temperature sensor readings. The calibration operation may be used to test all units, and the data sets may be brought forward for use in imaging system operation. The data sets may be derived for any number of pixels, including a table for each pixel. The resultant data sets are stored into each production unit. During actual use by a user, for any given actual observed signal and temperature sensor value, the closest corresponding actual scene temperature is found on the data set and reported to a user as a scene temperature for that pixel.

For greater accuracy, interpolation may be used when the signal levels and temperature sensor lie between the data points. Possible interpolation techniques include linear, bi-linear, or bi-cubic interpolations. For any observed ambient temperature and signal, with interpolation, a value of the scene temperature within interpolated distance of actual calibration data is produced, leading to reasonably complete thermography data for the micro-core. It is also possible to pre-interpolate the data before interpolated values are needed, storing them for later operational use to avoid taking the extra time for the calculations for each image frame during camera use. Thus, the data actually stored may be several times denser than the test data points if subjected to pre-interpolation. It is also possible to store subsets of the test data and reconstruct with interpolation. Alternatively, interpolation could be done during non-imaging or camera downtimes during operation, such as at start-up. At any rate performing the interpolation at times other than actual imaging operation may be desirable.

For instance, for imaging systems with a shutter, there may be time during shutter closing and opening periods where frames of image data need not be acquired and processed. During these "dead periods", the temperature sensor may be read and all possible interpolated values of scene temperature vs. signal corresponding to the read ambient temperature may be pre-calculated. For shutterless systems, there may be times where the interpolation calculations may be pre-calculated, such as those introduced by purposely skipping one or more frames at a regular interval, say every 10 or 20 frames, by updating the temperature sensor value and performing the interpolation pre-calculation. Alternatively, it may be practical to simply pre-interpolate, such as at calibration, initial start-up, regular start-up or other time that doesn't affect the operation of the imaging system, and simply store the fully interpolated tables. Depending on the level of interpolation, the storage required may be perfectly practical. For instance, as shown in FIG. 10, for a calibration of 8 black-body scene temperatures imaged at 15 different ambient temperatures, there will be 120 values per pixel in the FPA. For a QVGA FPA this amounts to ~9.2 million values of data that needs to be stored without interpolation. If, for example, ×4 interpolation is used (as shown in FIG. 10), it increases the storage required by a factor of 4 to ~37 million. If it is practical to store 9 million values as the minimum needed, then for many systems 39 million is on the same order and possibly accommodated without undue cost or performance penalties, as memory storage of these sizes is commonly available in modern computing devices The calibration data may be recorded and saved for later processing or processed during test depending on the processing capability designed into the test set-up. Calibration data may be acquired and stored for every pixel. However, if the FPA design is relatively uniform in terms of pixel response and temperature dependence, it may be possible to acquire calibration data from a smaller number of pixels, for example a group of center pixels, and use the reduced pixel calibration data for all pixels. The calibration data, once processed, may be provided with the micro-core for storage in the host system processor, or alternatively if the micro-core has memory capability stored onboard the micro-core.

Figure 11:
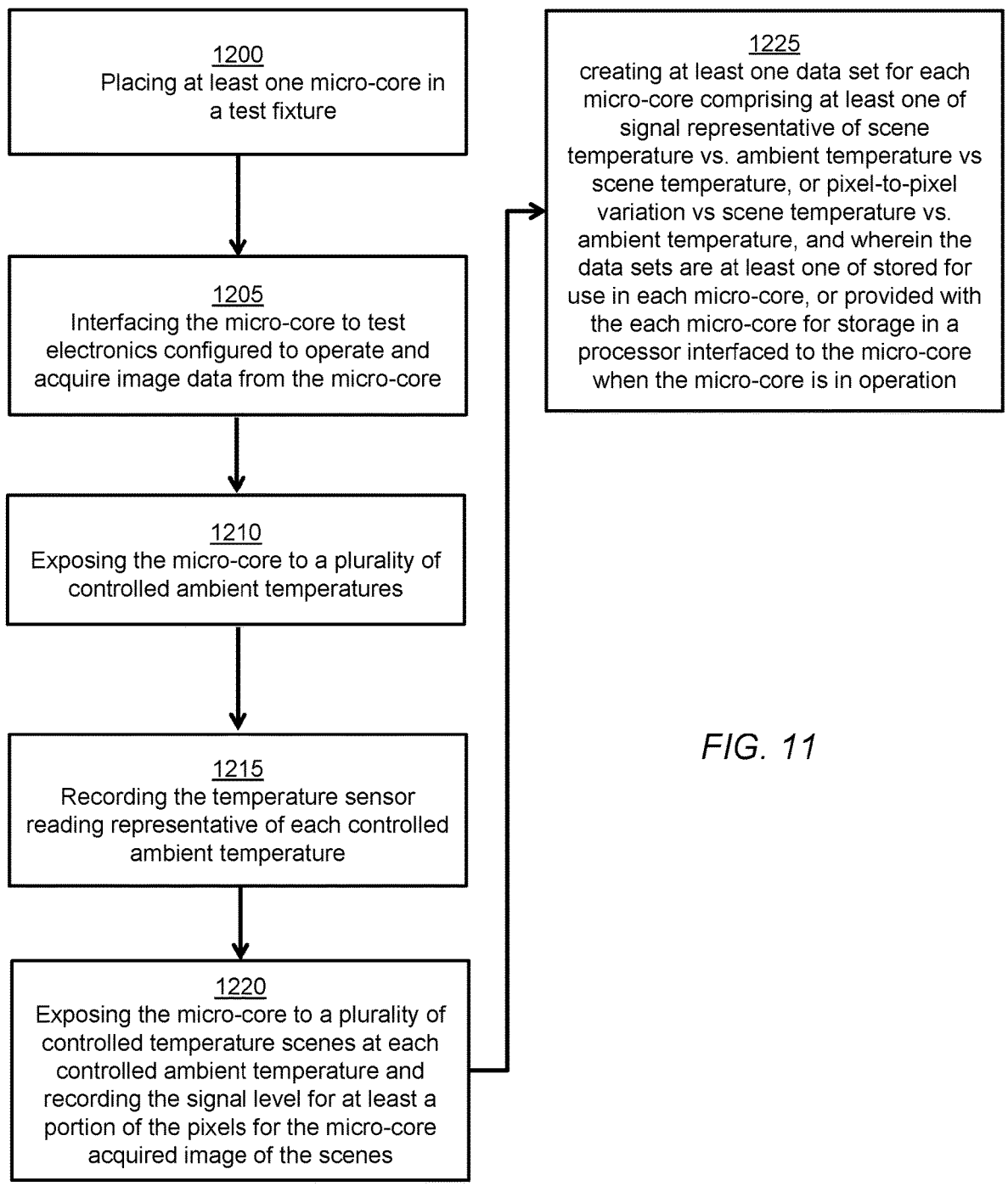
FIG. 11 shows a flow chart for an illustrative test process.

FIG. 11 is a flow chart showing the test process using a setup such as the one shown in FIG. 9.

In the discussion above, for simplicity, the description of the calibration process implies that each test point occurs at a predetermined FPA temperature and a predetermined scene temperature. However, even for a very small device such as the micro-core 100 of this disclosure, waiting for the micro-core 100 to come to temperature equilibrium when the heat sink temperature is changed may take an undesirably long time for high volume production. Therefore it may not be desirable to acquire data in a step and settle temperature fashion, but rather to continuously or partly continuously sweep the temperature and acquire scene data asynchronously with FPA ambient temperature.

Such an approach is possible because, in reality as discussed above, during use the imaging system employing the micro-core 100 will access the thermography table based on the reading of the onboard temperature sensor. Although it may be desirable to know the actual FPA temperature, scenes acquired looking at the temperature controlled black-bodies end up being correlated to the temp sensor reading regardless. It may be desirable to know the actual FPA temperature for other reasons, but in terms of accessing the thermography information, it is not necessary.

So it is possible, and potentially desirable, to continuously ramp the temperature of the micro-core under test, and as long as it is known which temperature black-body temperature is being viewed for each data point, which is straightforward for a variety of test setup configurations, a data set representing temp sensor reading vs pixel signal for a given scene temperature can still be generated for multiple scene temperatures and FPA temperatures. The data can be acquired much faster as the FPA temperature need never settle. The data acquisition time, essentially the frame rate, is faster than the ambient temperature rate of change, so it is practical to acquire one or more frames of scene data and correlate the one or more frames of scene data with the current temperature sensor value.

The data set acquired will be stretched in that the distance between acquired data points may not be consistent as it would for a step and settle arrangement. This effect may make interpolation less straightforward. This can be addressed in one of two ways. Either the stretched data may be pre-fit back to fixed temperature increments, or if the temperature rate of change curve is known, the interpolation used may be arranged to follow the curve, rather than be a standard type of interpolation.

As previously discussed herein and in the incorporated references, thermal imagers are prone to a variety of effects that degrade image quality. In particular, it is difficult to produce thermal FPA's whose pixels have uniform response or whose response varies the same with changes to ambient environment. Thus, it is usually necessary to perform a Non-Uniformity Correction (NUC) on thermal imagers repeatedly over time during operation of a thermal imager. In most of the incorporated references a shutter is used for this NUC, where which is periodically closed to cover the FPA field-of-view with a uniform scene and measure pixel-to-pixel variations. An offset correction for each pixel may be developed and updated each time the shutter closes. However, for a micro-core 100 the inclusion of a shutter may not be desirable due to size and cost constraints.

Thermal imagers have been produced without shutters, and they rely on various image processing techniques for offset correction, generally referred to as Scene-Based NUC (SBNUC). SBNUC techniques, of which there many, have tended to be used in imagers whose performance both in terms of pixel-to-pixel and pixel over time variations are relatively good. However, many design techniques that result in improved basic performance are not available within the cost and size constraints of the micro-core 100.

Figure 12:
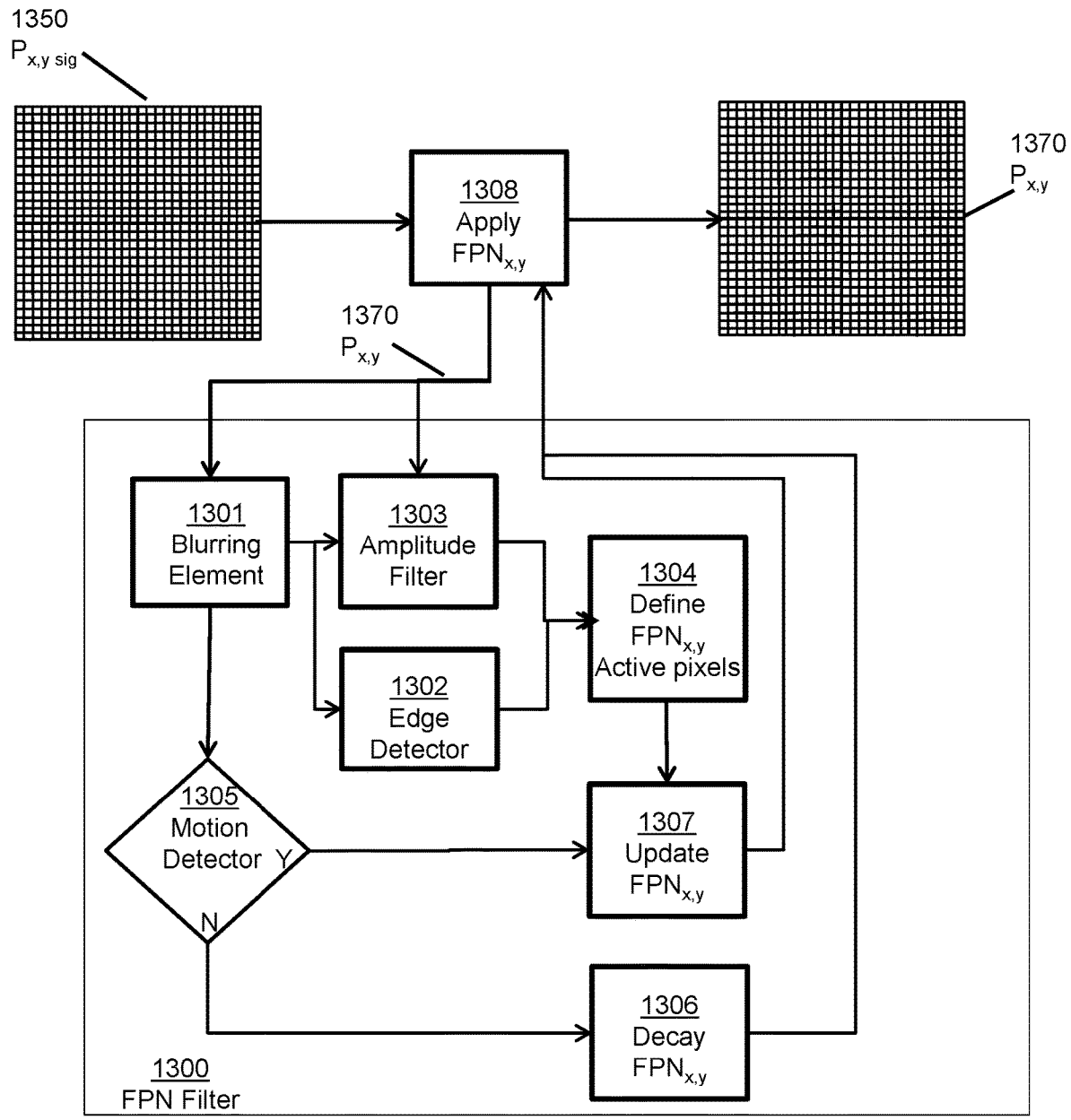
FIG. 12 shows an exemplary Fixed-Pattern Noise Correction (FPN) for Scene-Based Non-Uniformity Correction (SBNUC).

In incorporated reference Ser. No. 15/629,526, a Fixed-Pattern Noise (FPN) mitigation process is disclosed as shown in FIG. 12, where Elements 1301 to 1307 form FPN filter 1300. This filter uses motion of the image, as well as a blurring function and other processes, to create a set of pixel-by-pixel FPN correction terms that are applied (1308) to an incoming image 1350 to create an FPN-corrected image 1370. The FPN filter, or an equivalent filter, can be used to perform SBNUC. In the incorporated reference it was disclosed that this process could be used without a shutter. However, the main embodiment disclosed assumed that incoming data 1350 has been offset corrected through shutter closing, and therefore when the FPN filter is turned on the time zero FPN correction mask is set to zero for all pixels and is then evolved over time by successive operations of the filter.

In many embodiments, the micro-core will not have a shutter. Due to the extensive calibration applied to each core, gain and offset data, both pixel-to-pixel and over time, or at least over ambient temperature (which is the largest time-dependent effect), is known by way of the calibration data sets. The series of known scene temperature vs. pixel signal and temp sensor readings are available during operation for thermography purposes. However, since these data sets were acquired with uniform scenes (i.e. the various black-bodies) they contain pixel-to-pixel gain and offset variations that can be derived directly from the data sets. This gain and offset data can be used in one or more ways. Reading the temperature sensor and looking at the corresponding data sets may allow derivation of a pixel-to-pixel variation map that is essentially equivalent, if not better than, that which can be derived from shutter closings. The corresponding map may be periodically used as a first stage NUC just as in the case where the FPN filter is used in a system with a shutter by looking at the current temperature sensor reading and accessing the corresponding calibration data set. Alternatively, when the FPN filter is initiated in the micro-core, it can be initially populated with data from the calibration data. In the most straightforward embodiment, although others are possible, the temperature sensor is read and the calibration data set values for that reading and the black-body reading corresponding to the temperature sensor (or the closest interpolated value) are used, suitably scaled as the initial values of for FPN correction. Thus, the SBNUC process is initialized with data that may be at least as good as that derived from shutter closings.

Of course, the offset information may require subsequent processing such as pixel substitution and outlier pixel suppression before it is passed in to the FPN filter. The calibration data saved is primarily scene temperature corresponding to observed signal and FPA temperature, and the relation between temperature and signal may not be straightforward. If the relationship is linear, then the temperature data may only need to be scaled and/or normalized. If it is not linear but known, then the relationship may be applied mathematically. If it is not known, or inconvenient to derive, then data sets for both signal and temperature may be saved and brought forward to camera operation. Again we are only typically dealing with a few 10's of megabytes, as shown above, or even less if interpolation is pre-calculated during operation. In any event, feeding forward offset information, inherently available from the extensive calibration, serves to mitigate the lack of a shutter.

Figure 13:
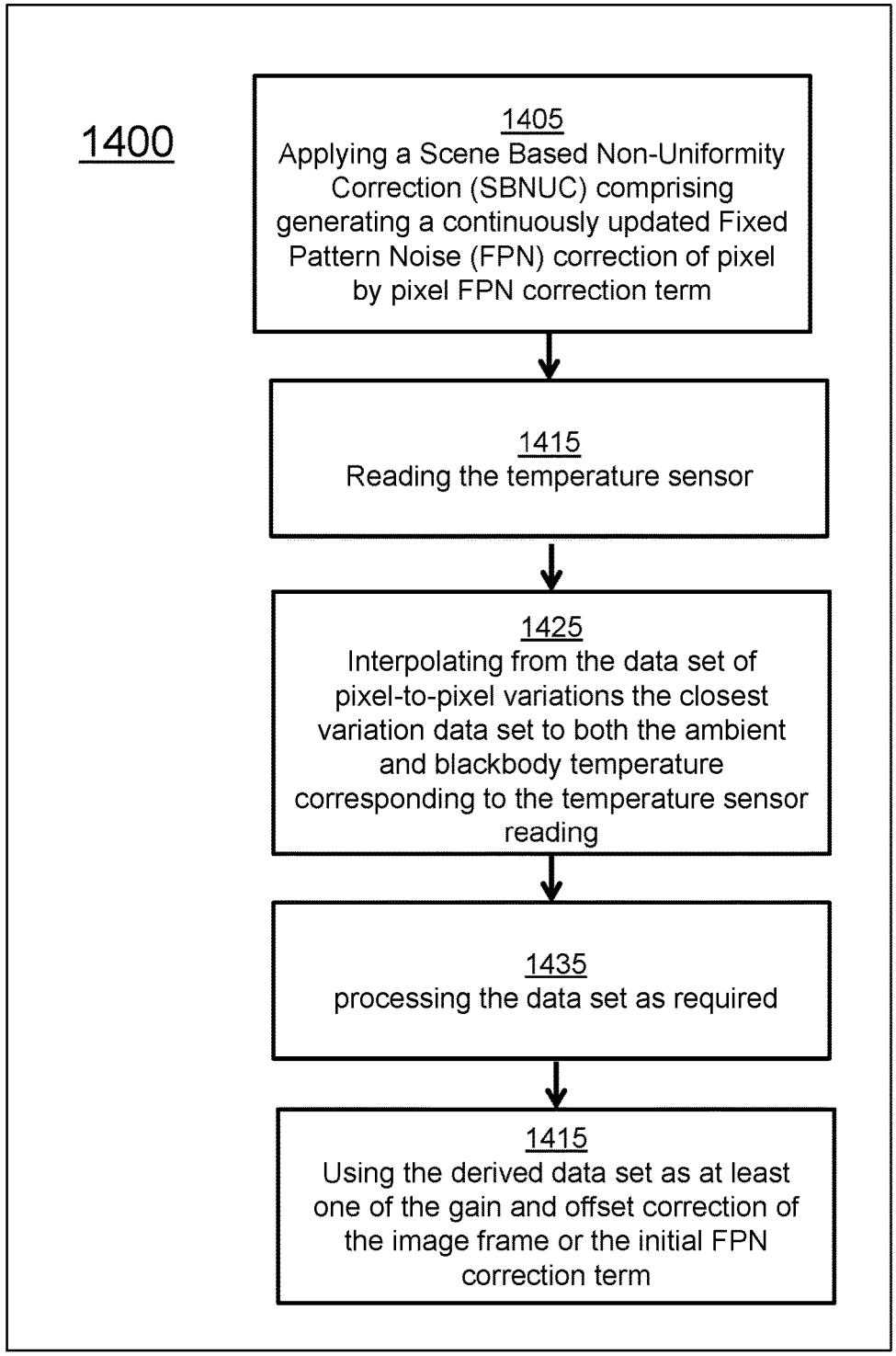
FIG. 13 is a flow chart for an exemplary FPN process.

FIG. 13 is a flow chart of SBNUC process using calibration data.

The calibration data whether in thermography form (scene temperature) or direct detector signal, represents the FPA response to a flat field, and therefore is equivalent in theory to shutter closing, with the added benefit that the flat field data is acquired over a range of scenes and ambient temperatures. Thus direct NUC offset corrections during imager operation may be pulled from the saved calibration data at any temperature sensor reading or scene observed, and may be interpolated if need be just like thermography data. Thus the calibration data may be used directly for NUC independently or in conjunction with pre filling the FPN mask.

The FPN filter may be different in some ways from a system with a shutter. For instance, it may not be desirable to decay the FPN correction, or at least not as aggressively, for a shutterless system. It also may be desirable to apply the FPN correction more aggressively, at least initially, in a shutterless system.

Figure 14:
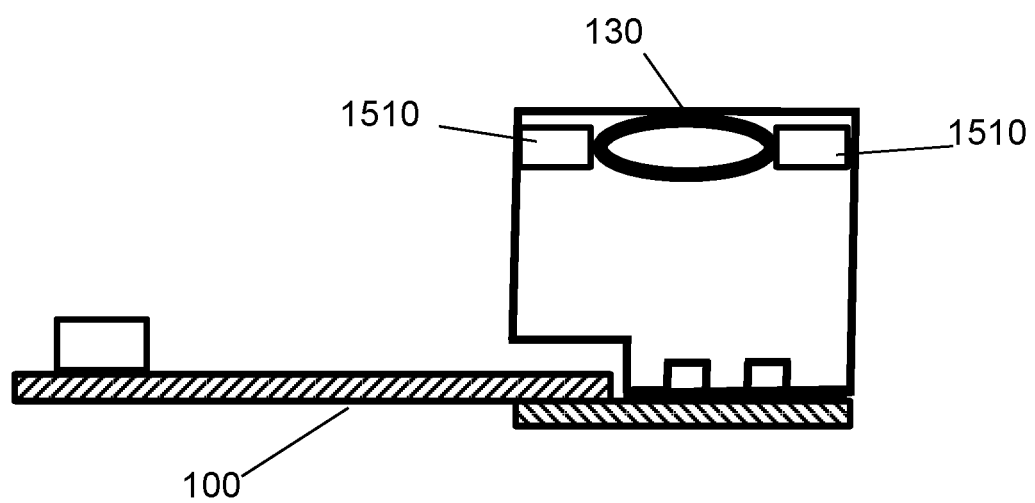
FIG. 14 shows schematically a lens dither embodiment to enable SBNUC for stationary systems.

One disadvantage of many SBNUC techniques is that they rely on image motion to operate and they are applied softly, i.e. in measured amounts to prevent bumpy or flashing images. For an application such as normal smartphone use, where the phone is in hand when the core is operating, lack of image motion is not a problem as there is continuous motion even if such motion is very subtle. However, for more stationary applications, such as security or monitoring cameras, as well as PED's used in tripods, lack of continuous image motion can be a problem for SBNUC. As shown in FIG. 14, a motion inducing component 1510 can be inserted between lens 130 and module 100. This motion can be very small and accomplished with a variety of electromechanical small-amplitude actuators, such as piezoelectric devices or muscle wire. The motion inducer can be activated when the FPN filter observes no motion for a predetermined time period and/or periodically, if desired. The motion inducer could also serve double duty as a fine focus actuator. In other embodiments, all or part of the core and/or host system may be mounted to a vibration inducing device such as a piezo-electric element, and all or part of the entire unit may be exposed to motion.

Another advantage of purposefully inducing motion is that sub-pixel resolution may be possible in an imaging system that is moved in small increments.

In terms of operation without a shutter, certain behaviors of bolometer based detector arrays present problems that may in fact exceed the ability of filters such as the FPN (SBNUC) filter described above. Referring to FIG. 16A, the vertical axis represents the pixel offset difference from the adjusted value at a point where the image has been offset corrected, i.e. corrected for non-uniformity. In other words at this point all of the pixels are offset corrected to be within a within a narrow range of each other, shown as the midpoint of the graph. The horizontal axis is the onboard temperature sensor value, with the center point being the temperature sensor value where the NUC was performed. As can be seen over the operating range of the system, the offset correction value changes, and the shape and amount of the change may be vary on a pixel by pixel basis. Thus, as FPA temperature changes, the pixel to pixel drift in offset will manifest itself as Fixed Pattern Noise.

In a shutter imager, this variation is taken out by the offset measurement with the shutter closed. The complete calibration described above is also intended to address this issue. However, in a shutterless system, this effect may overwhelm FPN filters, particularly for imagers which are used in applications where FPA temperature may vary rapidly and often. An example of an application where FPA temperature varies a lot is a micro-core installed in a device like a smartphone. The small size of the micro-core means its thermal mass is low, so ambient temperature changes affect the micro-core quickly. The very nature of being integrated into a small closed environment like a smart phone means the micro-core is subject to both external temperature effects such as the phone moving from indoors to out, storage and removal from insulating environments such as pockets, etc. and internal effects such as variable processor and internal component use. Due to these affects the data acquired at calibration may not always be representative of behavior during actual use.

An example offset variance vs FPA temperature for a single pixel is shown in FIG. 16B. The Figure illustrates how a relatively simple calibration can generate a significant correction for this effect. If the actual offset is acquired at just a few temperatures, even a simple linear fit (shown in the relatively larger dash-dash broken line in FIG. 16B) to the curve makes a large improvement. If a little more data is acquired and the fit is changed to two linear fits (shown in relatively the relatively smaller dash-dash broken lines in FIG. 16B) the improvement is even better, or an actual curve fit (polynomial, etc.) may yield even better results. This simple calibration and fit may be done simply by observing a flat scene while varying the FPA temperature a few times, and storing the offset correction, for any or all pixels.

However, since the micro-core will likely experience the full thermography calibration described above, In effect flat field response at multiple FPA and scene temperatures will exist. Rather than just storing the thermography data (e.g., the signal to temperature conversions) as described above, the offset curves may also be derived and stored directly from the calibration data. These offset correction tables may be interpolated for actual scene and temp sensor reading and used as either a direct NUC, a constantly updated input to the FPN filter or any combination of uses for offset data. But over time the performance may drift from that derived in even the most complete calibration.

Another technique that may improve the performance of shutterless imagers is to use the fact that for applications such as smartphones, the imager will observe flat scenes often. Using external flat field scenes basically to replace the functionality of a shutter is described in co-pending U.S. patent application Ser. Nos. 15/940,795 and 16/013,270, filed Mar. 29, 2018 and Jun. 20, 2018, respectively.

The use of external flat field scenes may be used to check if the offset drift described in the description of FIGS. 16A and 16B changes over time. Simply by noting the temperature sensor value when a flat field is acquired, the system may check to see if the correction is still on the curve stored at calibration. Alternatively, it may actually be beneficial to use the simpler curve fit approach and update it by acquiring flat field data during operation at more than one temperature sensor value, which may be practical as device temperature variations will happen naturally over time. Alternatively, during an external flat field acquisition, the imager may possibly communicate with the host device (e.g. smartphone) and initiate an operation to drive the internal temperature up or down between acquisitions, such as by turning on or off internal components, increasing processor load etc., in order to get two or more temperature data points. Using the updated curve approach may be beneficial for cases where the offset drift vs FPA temp changes significantly over time. Or alternatively, the system may switch from calibration data correction to updated curve fit if extreme change in behavior is observed. The offset drift update during operation may be improved if the room temperature is known (i.e. the smartphone knows ambient temperature) as this can help knowing the external flat field scene temperature. For instance if the external flat field is a wall or ceiling, it is likely at or near room temperature.

The micro-core of the current disclosure may be designed to be used in an instrument or device of some kind, such as a very small thermal imager (e.g., a camera, security monitor etc.), or a personal device such as a smartphone or tablet. In many cases, particularly personal devices, the micro-core will likely co-reside with a visible spectrum camera, with the micro-core and the visible spectrum camera likely imaging the same, or at least an overlapping, field of view. For these applications, multi-spectral image fusion, in this case the blending or combining of information from the thermal and visible imagers into one fused image, may be desirable. Image fusion in many of its current implementations can be difficult for unsophisticated users, as the parameters used to create the fused image can be confusing. One straightforward way to make image fusion accessible to a wide variety of users is to limit the options for which information to combine and how to combine it. A common image fusion implementation is to extract the edge information from a visible image, and blend the edge information with the thermal image of the same or partially the same scene, with a blending coefficient setting the weight of the amount of blend, e.g., a coefficient of 1 means a corresponding pixel of a thermal image is replaced with a pixel from the visible image and so on. This approach can be useful if the thermal image and the visible image are of the same or partially the same field of view. The detail from the visible image will be high compared to the thermal due to inherently higher resolution attainable at visible wavelengths along with (usually) more pixels in a visible imager. So overlaying visible image edges on the thermal image of the same scene may make the thermal image more understandable.

However thermal imagers often allow for a user to use a variety of color tables which essentially allow for false color display of temperature data. Depending on color table, the optimal blending coefficient of the visible image derived edge image with the thermal image to achieve a desirable appearing fused image will vary with color table chosen. An improvement in the usability of image fusion may be achieved if the blending coefficient is pre-chosen depending on the thermal image color table selected.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more computer/logic processing elements.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements, and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A thermal imaging micro-core, comprising:
   a thermal imaging Focal Plane Array, micro-fabricated at least in part of a first material;
   a substrate of a second material that has substantially the same thermal properties as the first material;
   at least one optical element;
   an optical housing; and
   a circuit element comprising a flex circuit, wherein the FPA and the flex circuit are each bonded to a first side of the substrate, the optical element is attached to the housing, the housing is bonded to the substrate with the optical element disposed to expose the FPA to external scenes, and the circuit element is configured to provide connections between the FPA and a host system, and wherein the housing, substrate and FPA assembled together are less than 0.5" in the longest dimension, and the micro-core with the circuit element assembled together are less than 1.5" long and 0.5" in all other dimensions.

2. The micro-core of claim 1 wherein the first and second material are both silicon.

3. The micro-core of claim 2 wherein the substrate is a section diced from a silicon wafer of substantially the same thickness as a wafer the FPA is micro-fabricated from.

4. The micro-core of claim 1 wherein the flex circuit is bonded to the substrate.

5. The micro-core of claim 4 wherein flex circuit connections to the FPA are made by wire-bonding between contact pads on the flex circuit and contact pads on the FPA.

6. The micro-core of claim 4 wherein flex circuit connections to the FPA are made by connections fabricated into the substrate.

7. The micro-core of claim 6 wherein the flex circuit connections to the substrate are made by at least one of solder connections between contact pads on the flex circuit and contact pads on the substrate, or bump connections between contact pads on the flex circuit and contact pads on the substrate.

8. The micro-core of claim 6 wherein FPA connections to the substrate are made by at least one of solder connections between contact pads on the FPA and contact pads on the substrate, or bump connections between contact pads on the FPA and contact pads on the substrate.

9. The micro-core of claim 1 wherein the circuit element includes a connector configured to be compatible with internal host system connectors.

* * * * *